US011893934B2

(12) United States Patent
Yue et al.

(10) Patent No.: US 11,893,934 B2
(45) Date of Patent: Feb. 6, 2024

(54) PIXEL DRIVING CIRCUIT, PIXEL DRIVING METHOD, DISPLAY APPARATUS AND METHOD FOR CONTROLLING THE SAME

(71) Applicant: BOE TECHNOLOGY GROUP CO., LTD., Beijing (CN)

(72) Inventors: Han Yue, Beijing (CN); Minghua Xuan, Beijing (CN); Can Zhang, Beijing (CN); Can Wang, Beijing (CN); Ming Yang, Beijing (CN); Ning Cong, Beijing (CN); Angran Zhang, Beijing (CN); Jiao Zhao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 476 days.

(21) Appl. No.: 17/256,504

(22) PCT Filed: Sep. 5, 2019

(86) PCT No.: PCT/CN2019/104589
§ 371 (c)(1),
(2) Date: Dec. 28, 2020

(87) PCT Pub. No.: WO2021/042338
PCT Pub. Date: Mar. 11, 2021

(65) Prior Publication Data
US 2022/0327996 A1 Oct. 13, 2022

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ......... G09G 3/3233; G09G 2300/0426; G09G 2300/0819; G09G 2300/0842;
(Continued)

(56) References Cited

U.S. PATENT DOCUMENTS

2007/0195025 A1* 8/2007 Korcharz ............... H05B 45/46 345/82
2009/0027376 A1* 1/2009 Kwon .................. G09G 3/3233 345/83
(Continued)

FOREIGN PATENT DOCUMENTS

CN 106251798 12/2016
CN 107358918 A * 11/2017 ........... G09G 3/3208
EP 3816978 5/2021

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*
(Continued)

*Primary Examiner* — Jeff Piziali
(74) *Attorney, Agent, or Firm* — Dority & Manning, P.A.

(57) ABSTRACT

A pixel driving circuit includes: a driving sub-circuit configured to supply a driving signal to an element to be driven; a detection sub-circuit electrically connected to a detection control signal terminal and a detection node and configured to detect a voltage value of the detection node in response to a detection control signal received at the detection control signal terminal. The detection node is equivalent to a point on a connection line between the driving sub-circuit and the element to be driven.

15 Claims, 14 Drawing Sheets

(52) U.S. Cl.
CPC . *G09G 2300/0842* (2013.01); *G09G 2310/08* (2013.01); *G09G 2320/029* (2013.01); *G09G 2320/045* (2013.01); *G09G 2330/08* (2013.01); *G09G 2330/10* (2013.01); *G09G 2330/12* (2013.01)

(58) Field of Classification Search
CPC ......... G09G 2310/08; G09G 2320/029; G09G 2320/045; G09G 2330/08; G09G 2330/10; G09G 2330/12; G09G 2300/0852; G09G 2300/0861; G09G 2310/0251
See application file for complete search history.

(56) References Cited

U.S. PATENT DOCUMENTS

| | | | | |
|---|---|---|---|---|
| 2013/0069966 | A1 | 3/2013 | Zhao et al. | |
| 2015/0243203 | A1 | 8/2015 | Kim et al. | |
| 2016/0267837 | A1* | 9/2016 | Wang | G09G 3/3225 |
| 2018/0144683 | A1* | 5/2018 | Shin | G09G 3/3225 |
| 2018/0211592 | A1* | 7/2018 | Li | G09G 3/3233 |
| 2019/0122616 | A1* | 4/2019 | Lee | G09G 3/3266 |
| 2019/0259336 | A1* | 8/2019 | Miyasaka | G09G 3/3291 |
| 2020/0074919 | A1 | 3/2020 | Hung et al. | |
| 2020/0098305 | A1* | 3/2020 | Yang | H03K 25/02 |
| 2020/0168150 | A1 | 5/2020 | Lin et al. | |
| 2020/0234639 | A1 | 7/2020 | Yang et al. | |
| 2021/0383752 | A1* | 12/2021 | Yang | G09G 3/3233 |

OTHER PUBLICATIONS

PCT International Search Report (w/ English translation) for corresponding PCT Application No. PCT/CN2019/104589, dated May 27, 2020, 8 pages.

* cited by examiner

PIXEL DRIVING CIRCUIT, PIXEL DRIVING METHOD, DISPLAY APPARATUS AND METHOD FOR CONTROLLING THE SAME

CROSS-REFERENCE TO RELATED APPLICATION

This application is a national phase entry under 35 USC 371 of International Patent Application No. PCT/CN2019/104589 filed on Sep. 5, 2019, which is incorporated herein by reference in its entirety.

TECHNICAL FIELD

The present disclosure relates to the field of display technologies, and in particular, to a pixel driving circuit, a pixel driving method, a display panel, a display apparatus and a method for controlling the same.

BACKGROUND

Micro light-emitting diode (Micro LED) display apparatuses are attracting wide attention due to advantages of high luminous efficiency, low power consumption, and strong resistance to water and oxygen.

SUMMARY

In an aspect, a pixel driving circuit is provided, including: a driving sub-circuit configured to supply a driving signal to an element to be driven, a detection sub-circuit electrically connected to a detection control signal terminal and a detection node and configured to detect a voltage value of the detection node in response to a detection control signal received at the detection control signal terminal. The detection node is equivalent to a point on a connection line between the driving sub-circuit and the element to be driven.

In some embodiments, the detection sub-circuit includes a first transistor. A control electrode of the first transistor is electrically connected to the detection control signal terminal, a first electrode of the first transistor is electrically connected to the detection node, and a second electrode of the first transistor is configured to output the voltage value of the detection node.

In some embodiments, the pixel driving circuit further includes a compensation sub-circuit electrically connected to a compensation control signal terminal, a compensation data signal terminal, the detection node and a compensation output terminal. The compensation sub-circuit is configured to transmit the driving signal supplied by the driving sub-circuit from the detection node to the compensation output terminal according to a first compensation data signal received at the compensation data signal terminal and in response to a compensation control signal received at the compensation control signal terminal.

In some embodiments, the compensation sub-circuit includes an input unit, a storage unit and a compensation control unit. The input unit is electrically connected to the compensation control signal terminal, the compensation data signal terminal and the storage unit, and is configured to write the first compensation data signal into the storage unit in response to the compensation control signal. The storage unit is also electrically connected to the compensation control unit, and is configured to generate and store a second compensation data signal according to the written first compensation data signal, and to output the second compensation data signal to the compensation control unit. The compensation control unit is also electrically connected to the detection node and the compensation output terminal, and is configured to turn on a connection circuit between the detection node and the compensation output terminal in response to the second compensation data signal.

In some embodiments, the input unit includes a second transistor. A control electrode of the second transistor is electrically connected to the compensation control signal terminal, a first electrode of the second transistor is electrically connected to the compensation data signal terminal, and a second electrode of the second transistor is electrically connected to the storage unit.

In some embodiments, the storage unit includes a first inverter and a second inverter. A first terminal of the first inverter is electrically connected to the input unit and a fourth terminal of the second inverter, a second terminal of the first inverter is electrically connected to a first voltage terminal, a third terminal of the first inverter is electrically connected to a second voltage terminal, and a fourth terminal of the first inverter is electrically connected to the compensation control unit and a first terminal of the second inverter. A second terminal of the second inverter is electrically connected to the first voltage terminal, and a third terminal of the second inverter is electrically connected to the second voltage terminal.

In some embodiments, the first inverter includes a third transistor and a fourth transistor, and the second inverter includes a fifth transistor and a sixth transistor. Each of the third transistor and the fifth transistor is one of P-type transistor and N-type transistor, and each of the fourth transistor and the sixth transistor is another one of P-type transistor and N-type transistor. A control electrode of the third transistor is electrically connected to the input unit, a second electrode of the fifth transistor and a second electrode of the sixth transistor, a first electrode of the third transistor is electrically connected to the first voltage terminal, and a second electrode of the third transistor is electrically connected to a second electrode of the fourth transistor, a control electrode of the fifth transistor, a control electrode of the sixth transistor and the compensation control unit. A control electrode of the fourth transistor is electrically connected to the input unit, the second electrode of the fifth transistor and the second electrode of the sixth transistor, a first electrode of the fourth transistor is electrically connected to the second voltage terminal, and the second electrode of the fourth transistor is further electrically connected to the control electrode of the fifth transistor, the control electrode of the sixth transistor and the compensation control unit. A first electrode of the fifth transistor is electrically connected to the first voltage terminal, and the second electrode of the fifth transistor is electrically connected to the second electrode of the sixth transistor. A first electrode of the sixth transistor is electrically connected to the second voltage terminal.

In some embodiments, the compensation control unit includes a seventh transistor. A control electrode of the seventh transistor is electrically connected to the storage unit, a first electrode of the seventh transistor is electrically connected to the detection node, and a second electrode of the seventh transistor is electrically connected to the compensation output terminal.

In some embodiments, the detection sub-circuit includes a first transistor. A control electrode of the first transistor is electrically connected to the detection control signal terminal, a first electrode of the first transistor is electrically connected to the detection node, and a second electrode of the first transistor is configured to output the voltage value of the detection node. The compensation sub-circuit includes a second transistor, a third transistor, a fourth transistor, a fifth transistor, a sixth transistor and a seventh transistor. Each of the third transistor and the fifth transistor is one of P-type transistor and N-type transistor, and each of the fourth transistor and the sixth transistor is another one of P-type transistor and N-type transistor. A control electrode of the second transistor is electrically connected to the compensation control signal terminal, a first electrode of the second transistor is electrically connected to the compensation data signal terminal, and a second electrode of the second transistor is electrically connected to a control electrode of the third transistor and a control electrode of the fourth transistor. The control electrode of the third transistor is further electrically connected to a second electrode of the fifth transistor and a second electrode of the sixth transistor, a first electrode of the third transistor is electrically connected to a first voltage terminal, and a second electrode of the third transistor is electrically connected to a second electrode of the fourth transistor, a control electrode of the fifth transistor, a control electrode of the sixth transistor and a control electrode of the seventh transistor. The control electrode of the fourth transistor is further electrically connected to the second electrode of the fifth transistor and the second electrode of the sixth transistor, a first electrode of the fourth transistor is electrically connected to a second voltage terminal, and the second electrode of the fourth transistor is electrically connected to the control electrode of the fifth transistor, the control electrode of the sixth transistor and the control electrode of the seventh transistor. A first electrode of the fifth transistor is electrically connected to the first voltage terminal, and the second electrode of the fifth transistor is electrically connected to the second electrode of the sixth transistor. A first electrode of the sixth transistor is electrically connected to the second voltage terminal. A first electrode of the seventh transistor is electrically connected to the detection node, and a second electrode of the seventh transistor is electrically connected to the compensation output terminal.

In some embodiments, the first transistor, the second transistor and the seventh transistor are all P-type transistors or are all N-type transistors.

In some embodiments, the driving sub-circuit includes a driving signal control unit and a light-emitting time control unit. The driving signal control unit is electrically connected to a current scanning signal terminal, a light-emitting control signal terminal, a current data signal terminal and the light-emitting time control unit, and is configured to generate a driving signal according to a current data signal received at the current data signal terminal and in response to a current scanning signal received at the current scanning signal terminal and a light-emitting control signal received at the light-emitting control signal terminal, and to transmit the driving signal to the light-emitting time control unit. The light-emitting time control unit is electrically connected to a time scanning signal terminal, a time data signal terminal and the element to be driven, and is configured to transmit the driving signal to the element to be driven according to a time data signal received at the time data signal terminal and in response to a time scanning signal received at the time scanning signal terminal, and to control duration for transmitting the driving signal to the element to be driven.

In some embodiments, the driving signal control unit includes: a current data writing subunit, a compensation subunit, a first driving subunit, a light-emitting control subunit and an initialization subunit. The current data writing subunit is electrically connected to the current scanning signal terminal, the current data signal terminal and the first driving subunit, and is configured to write the current data signal into the first driving subunit in response to the current scanning signal. The compensation subunit is electrically connected to the current scanning signal terminal and the first driving subunit, and is configured to compensate the first driving subunit for a threshold voltage in response to the current scanning signal. The first driving subunit is electrically connected to a third voltage terminal and the light-emitting control subunit, and is configured to generate and output the driving signal according to the written current data signal and a third voltage signal received at the third voltage terminal. The light-emitting control subunit is electrically connected to the light-emitting control signal terminal, the third voltage terminal, the first driving subunit and the light-emitting time control unit, and is configured to transmit the driving signal output by the first driving subunit to the light-emitting time control unit according to the third voltage signal and in response to the light-emitting control signal. The initialization subunit is electrically connected to a reset signal terminal, an initialization voltage terminal and the first driving subunit, and is configured to transmit an initialization voltage signal received at the initialization voltage terminal to the first driving subunit in response to a reset signal received at the reset signal terminal, so as to initialize the first driving subunit. The light-emitting time control unit includes a time data writing subunit and a second driving subunit. The time data writing subunit is electrically connected to the time scanning signal terminal, the time data signal terminal and the second driving subunit, and is configured to write the time data signal into the second driving subunit in response to the time scanning signal. The second driving subunit is electrically connected to a common voltage terminal, the driving signal control unit and the element to be driven, and is configured to transmit the driving signal to the element to be driven according to the written time data signal and a common voltage signal received at the common voltage terminal.

In some embodiments, the current data writing subunit includes an eighth transistor. A control electrode of the eighth transistor is electrically connected to the current scanning signal terminal, a first electrode of the eighth transistor is electrically connected to the current data signal terminal, and a second electrode of the eighth transistor is electrically connected to the first driving subunit. The compensation subunit includes a ninth transistor. A control electrode of the ninth transistor is electrically connected to the current scanning signal terminal, and both a first electrode and a second electrode of the ninth transistor are electrically connected to the first driving subunit. The first driving subunit includes a driving transistor and a first capacitor. A control electrode of the driving transistor is electrically connected to a second terminal of the first capacitor, a first electrode of the driving transistor is electrically connected to the current data writing subunit and the light-emitting control subunit, and a second electrode of the driving transistor is electrically connected to the compensation subunit and the light-emitting control subunit. A first terminal of the first capacitor is electrically connected to the third voltage terminal, and the second terminal of the first capacitor is electrically connected to the compensation subunit. The light-emitting control subunit includes a tenth transistor and an eleventh transistor. A control electrode of the tenth transistor is electrically connected to the light-emitting control signal terminal, a first electrode of the tenth transistor is electrically connected to the third voltage terminal, and a second electrode of the tenth transistor is electrically connected to the first driving subunit. A control electrode of the eleventh transistor is electrically connected to the light-emitting control signal terminal, a first electrode of the eleventh transistor is electrically connected to the first driving subunit, and a second electrode of the eleventh transistor is electrically connected to the light-emitting time control unit. The initialization subunit includes a twelfth transistor. A control electrode of the twelfth transistor is electrically connected to the reset signal terminal, a first electrode of the twelfth transistor is electrically connected to the initialization voltage terminal, and a second electrode of the twelfth transistor is electrically connected to the first driving subunit. The time data writing subunit includes a thirteenth transistor. A control electrode of the thirteenth transistor is electrically connected to the time scanning signal terminal, a first electrode of the thirteenth transistor is electrically connected to the time data signal terminal, and a second electrode of the thirteenth transistor is electrically connected to the time data writing subunit. The second driving subunit includes a fourteenth transistor and a second capacitor. A control electrode of the fourteenth transistor is electrically connected to a first terminal of the second capacitor, a first electrode of the fourteenth transistor is electrically connected to the light-emitting control subunit, and a second electrode of the fourteenth transistor is electrically connected to the element to be driven. The first terminal of the second capacitor is electrically connected to the time data writing subunit, and a second terminal of the second capacitor is electrically connected to the common voltage terminal.

In another aspect, a pixel driving method is provided, which is applied to the pixel driving circuit, and the pixel driving method includes: in a scanning phase, writing the current data signal into the driving sub-circuit of the pixel driving circuit; in a light-emitting phase, generating, by the driving sub-circuit, the driving signal according to the written current data signal, and supplying, by the driving sub-circuit, the driving signal to the element to be driven corresponding to the pixel driving circuit; and in a detection phase, detecting, by the detection sub-circuit of the pixel driving circuit, the voltage value of the detection node of the pixel driving circuit under control of the detection control signal, and outputting, by the detection sub-circuit of the pixel driving circuit, the voltage value of the detection node. The detection phase is within the light-emitting phase.

In some embodiments, the pixel driving circuit further includes a compensation sub-circuit, the pixel driving method further includes, after the detection phase: in a compensation phase, receiving, by the compensation sub-circuit, the compensation control signal and the first compensation data signal, and transmitting, by the compensation sub-circuit, the driving signal supplied by the driving sub-circuit to the compensation output terminal corresponding to the pixel driving circuit from the detection node according to the first compensation signal and under control of the compensation control signal. The compensation phase is within the light-emitting phase.

In yet another aspect, a display panel is provided, including a plurality of sub-pixels. At least one sub-pixel of the plurality of sub-pixels includes any one of the pixel driving circuits as described above, and the element to be driven includes at least one light-emitting diode.

In some embodiments, the pixel driving circuit includes a compensation sub-circuit, a compensation output terminal corresponding to each sub-pixel of the at least one sub-pixel is electrically connected to a detection node of a pixel driving circuit of a sub-pixel that emits a same color as and is adjacent to the sub-pixel.

In some embodiments, the plurality of sub-pixels are arranged in an array, and the plurality of sub-pixels arranged in the array include a plurality of rows of sub-pixels emitting a same color or a plurality of columns of sub-pixels emitting a same color. In each row of sub-pixels with the same color or each column of sub-pixels emitting the same color, a compensation output terminal corresponding to one of every two adjacent sub-pixels is electrically connected to a detection node of a pixel driving circuit of another one of the two adjacent sub-pixels.

In yet another aspect, a display apparatus is provided, including: any one of the display panels as described above; and a processor. The processor is electrically connected to the detection sub-circuit of the pixel driving circuit of at least one sub-pixel of the display panel, and is configured to transmit the detection control signal to the detection sub-circuit connected thereto, and to receive the voltage value of the detection node detected by the detection sub-circuit connected thereto, and to determine a working state of the element to be driven according to the voltage value of the detection node.

In some embodiments, the pixel driving circuit of the at least one sub-pixel of the display panel further includes a compensation sub-circuit, the processor is also electrically connected to the compensation sub-circuit, and the processor is further configured to transmit a compensation control signal and a first compensation data signal to a respective compensation sub-circuit in response that it is determined that the working state of the element to be driven is open-circuited.

In yet another aspect, a method for controlling a display apparatus is provided, which is applied to any one of the display apparatuses as described above, and the method for controlling the display apparatus includes: transmitting the detection control signal to the detection sub-circuit of the pixel driving circuit of the display panel, so as to control the detection sub-circuit to detect the voltage value of the detection node of the pixel driving circuit; receiving the voltage value of the detection node output by the detection sub-circuit; and determining the working state of the element to be driven according to the voltage value of the detection node.

BRIEF DESCRIPTION OF THE DRAWINGS

In order to describe technical solutions in embodiments of the present disclosure more clearly, accompanying drawings to be used in the description of embodiments will be introduced briefly. Obviously, the accompanying drawings to be described below are merely some embodiments of the present disclosure, and a person of ordinary skill in the art can obtain other drawings according to these drawings.

DETAILED DESCRIPTION

Some embodiments of the present disclosure will be described in combination with the accompanying drawings. Obviously, the described embodiments are merely some but not all of the embodiments of the present disclosure. All other embodiments made on the basis of the embodiments of the present disclosure by a person of ordinary skill in the art shall be included in the protection scope of the present disclosure.

Terms “first”, “second”, “third” and “fourth” are only used for descriptive purposes and are not to be construed as indicating or implying the relative importance or implicitly indicating the number of indicated technical features. Thus, features defined as “first”, “second”, “third” and “fourth” may explicitly or implicitly include one or more of the features. In the description of the embodiments of the present disclosure, the term “a plurality of/the plurality of” means two or more unless otherwise specified.

In a manufacturing process of a micro light-emitting diode display apparatus, since a growth substrate and a display substrate used for manufacturing micro light-emitting diodes are substrates of different materials, it is necessary to transfer the manufactured micro light-emitting diodes from the growth substrate to the display substrate and bond the micro light-emitting diodes. In processes, such as massive transfer and effective bonding of the micro light-emitting diodes, that are involved in this processing, it is apt to cause damage to and invalid bonding of the micro light-emitting diodes. Therefore, after the micro light-emitting diodes are bonded to the display substrate, it is highly necessary to detect the bonded micro light-emitting diodes to obtain a yield thereof. In addition, since a size of a micro light-emitting diode is small, difficulties in detecting the micro light-emitting diodes in the related art are high.

Figure 1:
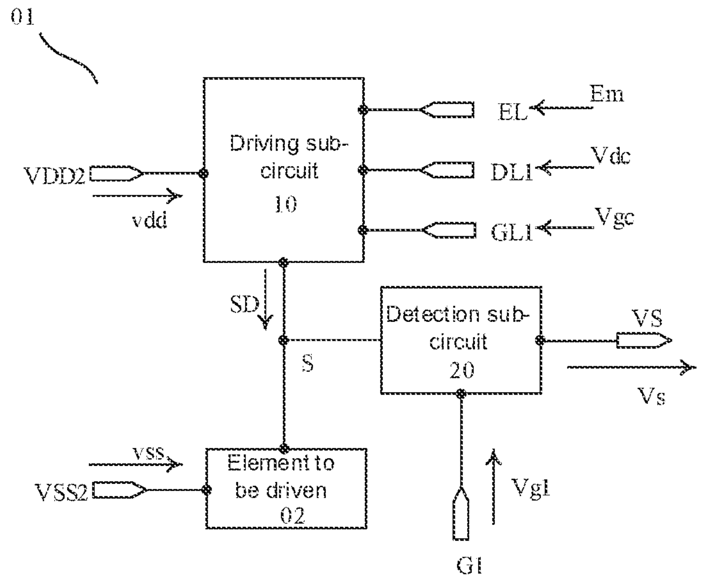
FIG. 1 is a schematic diagram of a pixel driving circuit, in accordance with some embodiments of the present disclosure.

Referring to FIG. 1, some embodiments of the present disclosure provide a pixel driving circuit 01, and the pixel driving circuit includes a driving sub-circuit 10 and a detection sub-circuit 20. The detection sub-circuit 20 is electrically connected to a detection control signal terminal G1 and a detection node S, and the detection sub-circuit 20 is configured to detect a voltage Vs of the detection node S in response to a detection control signal Vg1 received at the detection control signal terminal G1. The detection node S is equivalent to a point on a connection line between the driving sub-circuit 10 and an element to be driven 02.

In this way, in a current path where the driving sub-circuit 10 and the element to be driven 02 are connected in series, for example, in FIG. 1, the driving sub-circuit 10 is electrically connected to a third voltage terminal VDD2, and the element to be driven 02 is electrically connected to a fourth voltage terminal VSS2, the detection node S is equivalent to a point on the connection line between the driving sub-circuit 10 and the element to be driven 02. Thus, the voltage Vs of the detection node S is equal to or approximately equal to a sum of a voltage of the fourth voltage terminal VSS2 and a division voltage of the element to be driven 02 in the current path. Therefore, by detecting the voltage Vs of the detection node S, the division voltage of the element to be driven 02 may be obtained.

There is a corresponding relationship between the division voltage of the element to be driven 02 in the current path and a working state of the element to be driven, and thus the working state of the element to be driven may be determined through the detected voltage Vs of the detection node S. Therefore, the pixel driving circuit may realize detection of a defective sub-pixel in the sub-pixels of the display apparatus without detecting the element to be driven, which improves convenience and operability of detection.

It will be noted that, in some embodiments, the element to be driven 02 includes at least one light-emitting device. In this case, the working state of the element to be driven 02 refers to an electrical condition exhibited by the element to be driven 02 when the element to be driven 02 is located in the current path, which includes, for example: normal operation, i.e., the element to be driven 02 being turned on and normally emitting light; short circuit, i.e., the element to be driven 02 being short-circuited and not emitting light normally; and open circuit, i.e., the element to be driven 02 being open-circuited and not turned on, and not emitting light normally.

If the element to be driven is a micro light-emitting diode, the pixel driving circuit 01 does not need to electrically detect the micro light-emitting diode itself, but instead detects the voltage Vs of the detection node S to realize detection of the yield of the micro light-emitting diodes. Therefore, even though the size of the micro light-emitting diode is small, an effective detection may be achieved, thereby reducing the difficulty of detection.

Herein, the pixel driving circuit 01 can be applied to a manufacturing process of the micro light-emitting diode display apparatus. That is, the elements to be driven 02 are micro light-emitting diodes, and the micro light-emitting diodes on the display substrate are detected after the micro light-emitting diodes are bonded to the display substrate, so that those elements to be driven 02 unable to work on the display substrate may be easily found for subsequent repair or replacement.

Figure 5:
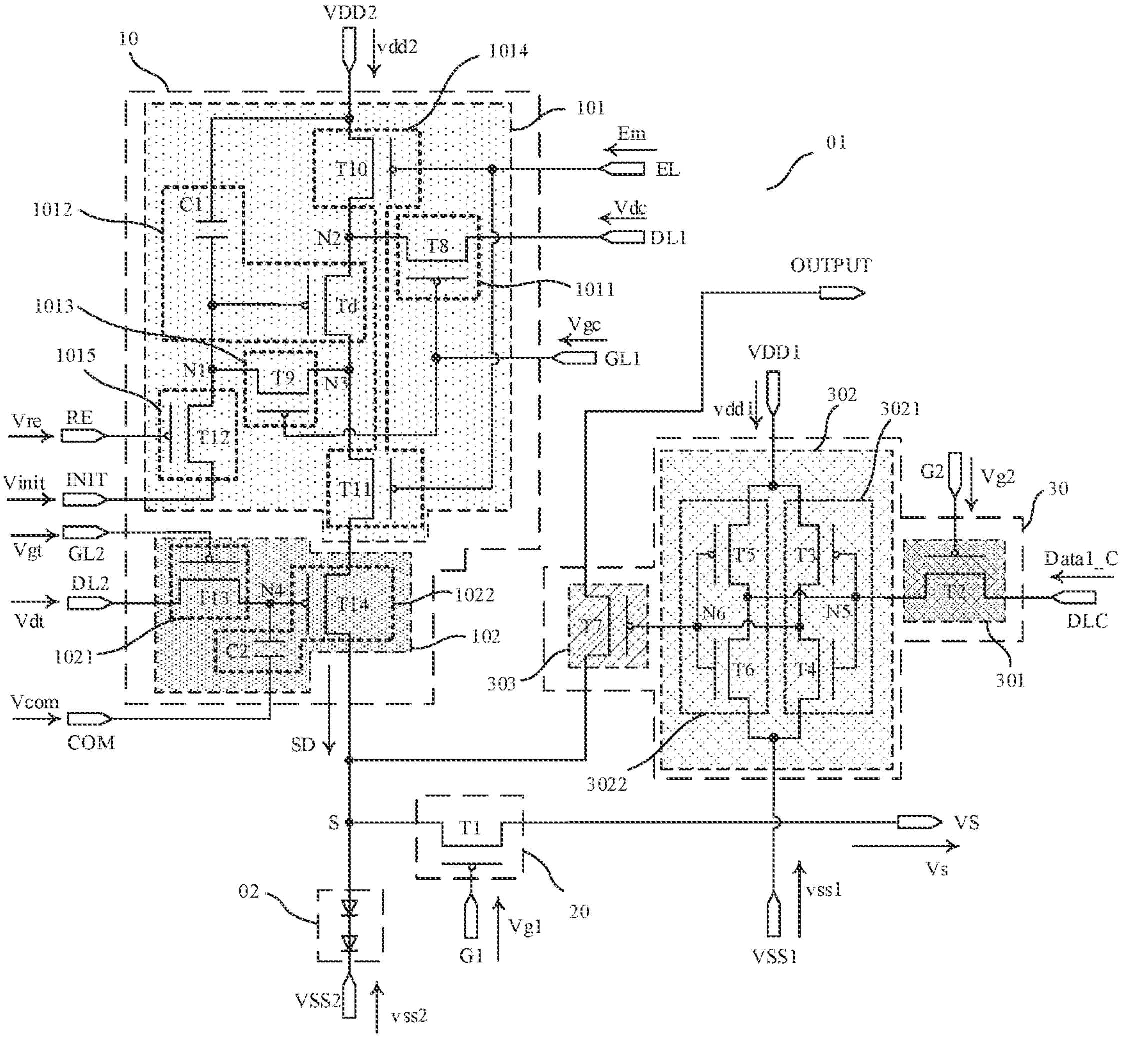
FIG. 5 is a schematic diagram of yet another pixel driving circuit, in accordance with some embodiments of the present disclosure.

For example, as shown in FIG. 5, the detection sub-circuit 20 includes a first transistor T1. A control electrode of the first transistor T1 is electrically connected to the detection control signal terminal G1, a first electrode of the first transistor T1 is electrically connected to the detection node S, and a second electrode of the first transistor T1 is configured to output the voltage Vs of the detection node S. Herein, the first transistor T1 is configured to output the voltage Vs of the detection node S to a detection output terminal VS in response to the detection control signal Vg1 received at the detection control signal terminal G1.

Figure 2:
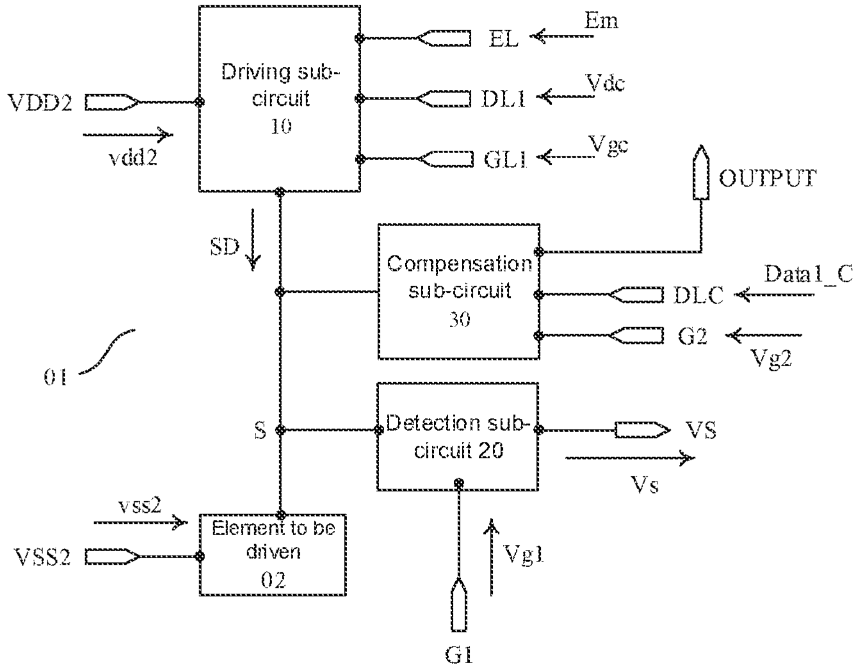
FIG. 2 is a schematic diagram of another pixel driving circuit, in accordance with some embodiments of the present disclosure.

Based on the above solution, in some embodiments of the present disclosure, referring to FIG. 2, the pixel driving circuit 01 further includes a compensation sub-circuit 30. The compensation sub-circuit 30 is electrically connected to a compensation control signal terminal G2, a compensation data signal terminal DLC, the detection node S and a compensation output terminal OUTPUT. The compensation sub-circuit 30 is configured to transmit a driving signal SD supplied by the driving sub-circuit 10 from the detection node S to the compensation output terminal OUTPUT according to a first compensation data signal Data1_C received at the compensation data signal terminal DLC and in response to a compensation control signal Vg2 received at the control signal terminal G2.

Figure 11:
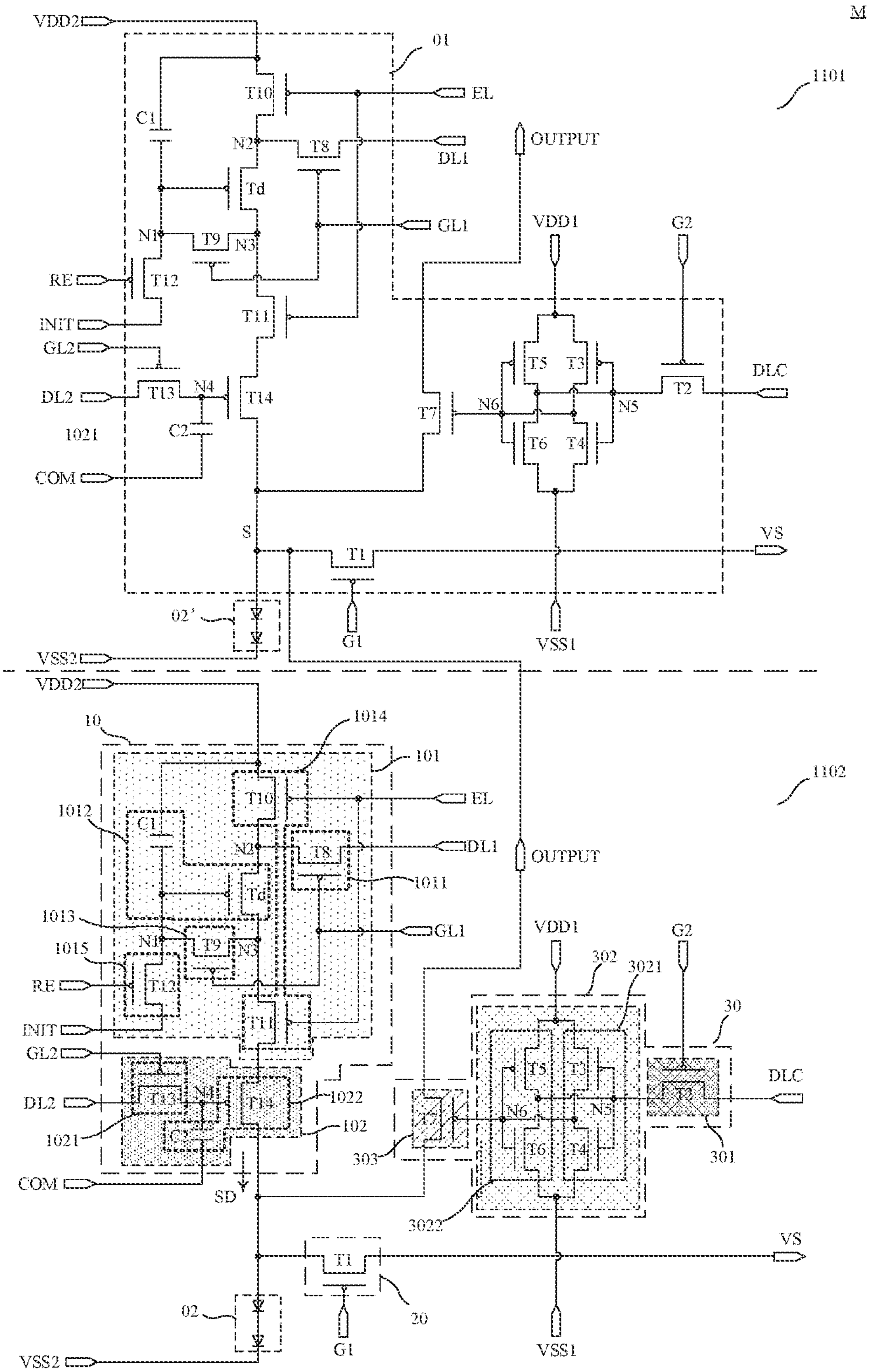
FIG. 11 is a schematic diagram showing a connection between pixel driving circuits of two sub-pixels within a region M in FIG. 10.

In this way, in a case where the element to be driven 02 electrically connected to the pixel driving circuit 01 cannot normally emit light due to an open circuit, the compensation sub-circuit 10 receives the first compensation data signal Data1_C, transmits the driving signal SD to the compensation output terminal OUTPUT for transmission according to the received first compensation data signal Data1_C, and transmits the driving signal SD to other elements to be driven 02' (e.g., as shown in FIG. 11) via the compensation output terminal OUTPUT, so that the other elements to be driven 02' receiving the driving signal SD may be caused to emit light instead of the element to be driven 02 that cannot normally emit light due to the open circuit. Therefore, pixels corresponding to the element to be driven 02 that is open-circuited in the display apparatus may be displayed normally, that is, defective pixels that are open-circuited in the display apparatus are repaired due to light emission compensation, which improves a display effect of the display apparatus, improves a reliability of the display apparatus, and prolongs a service life of the display apparatus.

For example, the other elements to be driven 02' that receive the driving signal SD emit the same color as and are adjacent to the element to be driven 02 that are replaced, so that it may be ensured that the corresponding pixels receive effective light emission compensation.

Herein, the pixel driving circuit 01 can be applied to a display apparatus during use. For example, in a case where a defective sub-pixel exists in the sub-pixels of the display apparatus, the pixel driving circuit 01 can detect the defective sub-pixel, and can cause the corresponding pixels in the display apparatus to be displayed normally by replace the defective sub-pixel with other sub-pixels that emit the same color as and are adjacent to the defective sub-pixel to emit light.

Figure 3:
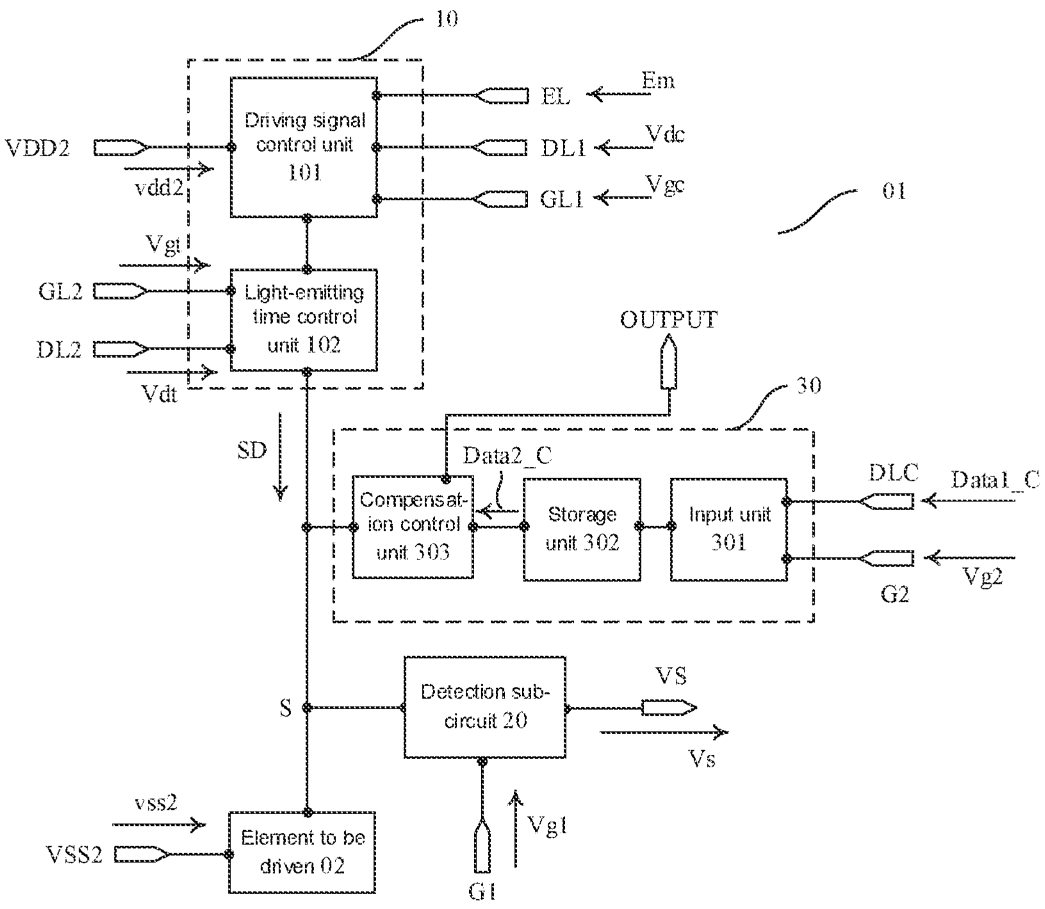
FIG. 3 is a schematic diagram of yet another pixel driving circuit, in accordance with some embodiments of the present disclosure.

Based on this, in some embodiments of the present disclosure, referring to FIG. 3, the compensation sub-circuit 30 includes an input unit 301, a storage unit 302 and a compensation control unit 303.

The input unit 301 is electrically connected to the control signal terminal G2, the compensation data signal terminal DLC and the storage unit 302, and is configured to write the first compensation data signal Data1_C into the storage unit 302 in response to the compensation control signal Vg2.

The storage unit 302 is also electrically connected to the compensation control unit 303, and is configured to generate and store a second compensation data signal Data2_C according to the written first compensation data signal Data1_C, and to output the second compensation data signal Data2_C to the compensation control unit 303.

The compensation control unit 303 is also electrically connected to the detection node S and the compensation output terminal OUTPUT, and is configured to turn on a connection circuit between the detection node S and the compensation output terminal OUTPUT in response to the second compensation data signal Data2_C.

For example, referring to FIG. 5, the input unit 301 includes a second transistor T2. A control electrode of the second transistor T2 is electrically connected to the control signal terminal G2, a first electrode of the second transistor T2 is electrically connected to the compensation data signal terminal DLC, and a second electrode of the second transistor T2 is electrically connected to the storage unit 302. Herein, the second transistor T2 is configured to transmit the first compensation data signal Data1_C received at the compensation data signal terminal DLC to the storage unit 302 in response to the compensation control signal Vg2 received at the control signal terminal G2.

It will be noted that a specific implementation of the storage unit 302 is not limited.

In some embodiments, the storage unit 302 is a static storage unit that stores the second compensation data signal Data2_C in a static storage manner. For example, the storage unit 302 is a static random-access memory (abbreviated as SRAM).

Figure 4:
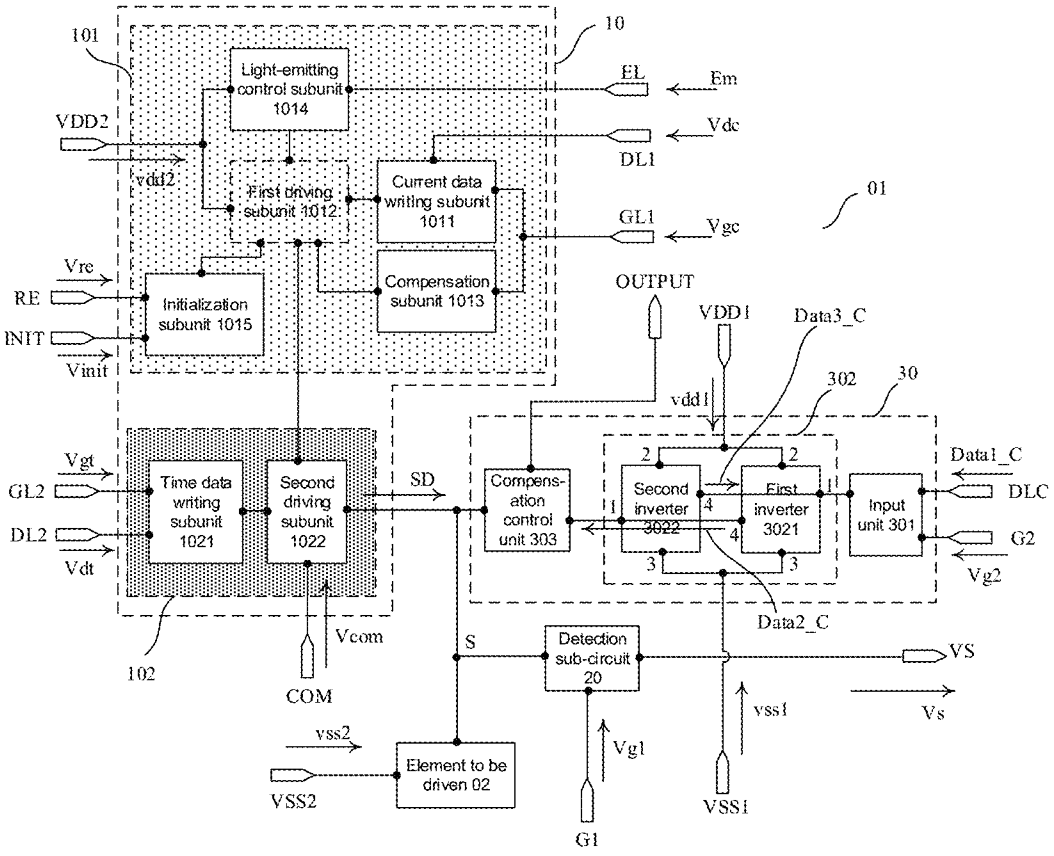
FIG. 4 is a schematic diagram of yet another pixel driving circuit, in accordance with some embodiments of the present disclosure.

For example, referring to FIG. 4, the storage unit 302 includes a first inverter 3021 and a second inverter 3022. A first terminal 1 of the first inverter 3021 is electrically connected to the input unit 301 and a fourth terminal 4 of the second inverter 3022, a second terminal 2 of the first inverter 3021 is electrically connected to the first voltage terminal VDD1, a third terminal 3 of the first inverter 3021 is electrically connected to the second voltage terminal VSS1, and the fourth terminal 4 of the first inverter 3021 is electrically connected to the compensation control unit 301 and a first terminal 1 of the second inverter 3022. A second terminal 2 of the second inverter 3022 is electrically connected to the first voltage terminal VDD1, and a third terminal 3 of the second inverter 3022 is electrically connected to the second voltage terminal VSS1.

It will be noted that both the first inverter 3021 and the second inverter 3022 can function to convert an input high level signal into a low level signal to be output, and convert an input low level signal into a high level signal to be output. The first inverter 3021 is taken as an example. If a signal input to the first inverter 3021 is a low level signal, a signal output by the first inverter 3021 is a high level signal; conversely, if a signal input to the inverter 3021 is a high level signal, a signal output by the first inverter 3021 is a low level signal. The second inverter 3022 also has such function, which will not be repeated herein.

In some embodiments, the first inverter 3021 is configured to receive the written first compensation data signal Data1_C through the first terminal 1 of the first inverter 3021, and to output the second compensation data signal Data2_C to the second inverter 3022 and the compensation control unit 303 through the fourth terminal 4 of the first inverter 3021. A level of the first compensation data signal Data1_C and a level of the second compensation data signal Data2_C are different ones of a low level and a high level, respectively.

The second inverter 3022 is configured to receive the second compensation data signal Data2_C through the first terminal 1 of the second inverter 3022, and to output a third compensation data signal Data3_C to the first inverter 3021 through the fourth terminal 4 of the second inverter 3022. A level of the third compensation data signal Data3_C and the level of the second compensation data signal Data2_C are different ones of a low level and a high level, respectively. It will be seen therefrom that the level of the third compensation data signal Data3_C and the level of the first compensation data signal Data1_C are a same one of the low level and the high level. That is, if the first compensation data signal Data1_C is a high level signal, the third compensation data signal Data3_C is also a high level signal; conversely, if the first compensation data signal Data1_C is a low level signal, the third compensation data signal Data3_C is also a low level signal. In this way, the first inverter 3021 may continuously output the second compensation data signal Data2_C to the compensation control unit 303, thereby maintaining an on state of the connection circuit between the detection node S and the compensation output terminal OUTPUT.

For example, in a case where the first compensation data signal Data1_C is a low level signal, the first inverter 3021 is configured to receive the low level signal through the first terminal 1 of the first inverter 3021, and to output a high level signal through its fourth terminal 4 to the second inverter 3022 and the compensation control unit 303. The second inverter 3022 is configured to receive a high level signal transmitted by the first inverter 3021 through the first terminal 1 of the second inverter 3022, and to output a low level signal through the fourth terminal 4 of the second inverter 3022 to the first terminal 1 of the first inverter 3021.

As another example, in a case where the first compensation data signal Data1_C is a high level signal, the first inverter 3021 is configured to receive the high level signal through its first terminal 1, and to output a low level signal through its fourth terminal 4 to the second inverter 3022 and the compensation control unit 303. The second inverter 3022 is configured to receive a low level signal transmitted from the first inverter 3021 through the first terminal 1 of the second inverter 3022, and to output a high level signal through the fourth terminal 4 of the second inverter 3022 to the first terminal 1 of the first inverter 3021.

In some embodiments, as shown in FIG. 5, the first inverter 3021 includes a third transistor T3 and a fourth transistor T4, and the second inverter 3022 includes a fifth transistor T5 and a sixth transistor T6. Each of the third transistor T3 and the fifth transistor T5 is one of P-type transistor and N-type transistor, and the fourth transistor T4 and the sixth transistor T6 is anther one of P-type transistor and N-type transistor. For example, if the third transistor T3 and the fifth transistor T5 are P-type transistors, the fourth transistor T4 and the sixth transistor T6 are N-type transistors; or the third transistor T3 and the fifth transistor T5 are N-type transistors, the fourth transistor T4 and the sixth transistor T6 are P-type transistors.

A control electrode of the third transistor T3 is electrically connected to the input unit 301, a second electrode of the fifth transistor T5 and a second electrode of the sixth transistor T6, a first electrode of the third transistor T3 is electrically connected to the first voltage terminal VDD1, and a second electrode of the third transistor T3 is electrically connected to a second electrode of the fourth transistor T4, a control electrode of the fifth transistor T5, a control electrode of the sixth transistor T6 and the compensation control unit 303. The third transistor T3 is configured to turn on or off a circuit between the first voltage terminal VDD1 and the control electrode of the fifth transistor T5, a circuit between the first voltage terminal VDD1 and the control electrode of the sixth transistor T6, and a circuit between the first voltage terminal VDD1 and the compensation control unit 303, in response to the written first compensation Data signal Data1_C.

A control electrode of the fourth transistor T4 is electrically connected to the input unit 301, the second electrode of the fifth transistor T5, and the second electrode of the sixth transistor T6, a first electrode of the fourth transistor T4 is electrically connected to the second voltage terminal VSS1, and a second electrode of the fourth transistor T4 is also electrically connected to the control electrode of the fifth transistor T5, the control electrode of the sixth transistor T6, and the compensation control unit 303. The fourth transistor T4 is configured to turn on or off a circuit between the second voltage terminal VSS1 and the control electrode of the fifth transistor T5, a circuit between the second voltage terminal VSS1 and the control electrode of the sixth transistor T6, and a circuit between the second voltage terminal VSS1 and the compensation control unit 303, in response to the written first compensation data signal Data1_C.

A first electrode of the fifth transistor T5 is electrically connected to the first voltage terminal VDD1, and the second electrode of the fifth transistor T5 is electrically connected to the second electrode of the sixth transistor T6. The fifth transistor T5 is configured to turn on or off a circuit between the first voltage terminal VDD1 and the control electrode of the third transistor T3, and a circuit between the first voltage terminal VDD1 and the control electrode of the fourth transistor T4, in response to a first voltage signal vdd1 transmitted from the turn-on third transistor T3 or in response to a second voltage signal vss1 transmitted from the turn-on fourth transistor T4.

A first electrode of the sixth transistor T6 is electrically connected to the second voltage terminal VSS1. The sixth transistor T6 is configured to turn on or off a circuit between the second voltage terminal VSS1 and the control electrode of the third transistor T3, and a circuit between the second voltage terminal VSS1 and the control electrode of the fourth transistor T4, in response to the first voltage signal vdd1 transmitted from the turn-on third transistor T3 or in response to the second voltage signal vss1 transmitted from the turn-on fourth transistor T4.

It will be noted that since the third transistor T3 and the fourth transistor T4 are different in type, in a case where the control electrode of the third transistor T3 and the control electrode of the fourth transistor T4 receive the first compensation data signal Data1_C, one of the third transistor T3 and the fourth transistor T4 is turned on and the other is turned off. Herein, a signal transmitted to the compensation control unit 303 through one of the third transistor T3 and the fourth transistor T4, which is turned on, is the second compensation data signal Data2_C, and the level of the second compensation data signal Data2_C and the level of the first compensation data signal Data1_C are different one of the high level and the low level.

For example, the third transistor T3 is turned on and the fourth transistor T4 is turned off. In this case, the first voltage signal vdd1 of the first voltage terminal VDD1 is transmitted to the control electrode of the fifth transistor T5, the control electrode of the sixth transistor T6, and the compensation control unit 303.

As another example, the third transistor T3 is turned off and the fourth transistor T4 is turned on. In this case, the second voltage signal vss1 of the second voltage terminal VSS1 is transmitted to the control electrode of the fifth transistor T5, the control electrode of the sixth transistor T6, and the compensation control unit 303.

Herein, since the fifth transistor T5 and the sixth transistor T6 are different in type, in a case where the control electrode of the fifth transistor T5 and the control electrode of the sixth transistor T6 receive the first voltage signal vdd1 transmitted from the turn-on third transistor T3 or the second voltage signal vss1 transmitted from the turn-on fourth transistor T4, one of the fifth transistor T5 and the sixth transistor T6 is turned on and the other is turned off.

In some other embodiments, the storage unit 302 may also adopt other storage manners. For example, the storage unit 302 is a dynamic storage unit that stores the second compensation data signal Data2_C dynamically. For example, the storage unit 302 is a capacitive dynamic random access memory (abbreviated as DRAM).

For example, the compensation control unit 303 includes a seventh transistor T7. A control electrode of the seventh transistor T7 is electrically connected to the storage unit 302, a first electrode of the seventh transistor T7 is electrically connected to the detection node S, and a second electrode of the seventh transistor T7 is electrically connected to the compensation output terminal OUTPUT. The seventh transistor T7 is configured to turn on the connection circuit between the detection node S and the compensation output terminal OUTPUT in response to the second compensation data signal Data2_C transmitted from the storage unit 302.

Herein, it will be noted that the type of the seventh transistor T7 is related to the level of the first compensation signal Data1_C. In FIG. 5, the seventh transistor T7 is illustrated as a P-type transistor, but the type of the seventh transistor T7 is not limited thereto.

For example, if the first compensation signal Data1_C is a low level signal, the second compensation signal Data2_C received by the control electrode of the seventh transistor T7 is a high level signal. In this case, the seventh transistor T7 is an N-type transistor, which may ensure that the seventh transistor T7 is turned on when the control electrode of the seventh transistor T7 receives a high level signal, so that the circuit between the detection node S and the compensation output terminal OUTPUT is turned on, thereby ensuring that the corresponding pixels is compensated in light emission.

As another example, if the first compensation data signal Data1_C is a high level signal, the second compensation signal Data2_C received by the control electrode of the seventh transistor T7 is a low level signal. In this case, the seventh transistor T7 is a P-type transistor, which may ensure that the seventh transistor T7 is turned on when the control electrode of the seventh transistor T7 receives a low level signal, so that the circuit between the detection node S and the compensation output terminal OUTPUT is turned on, thereby ensuring that the corresponding pixels is compensated in light emission.

Based on this, referring to FIG. 5, structures of the detection sub-circuit 20 and the compensation sub-circuit 30 included in the pixel driving circuit 01 in some embodiments of the present disclosure will be described integrally and exemplarily.

The detection sub-circuit 20 includes the first transistor T1. The control electrode of the first transistor T1 is electrically connected to the detection control signal terminal G1, the first electrode of the first transistor T1 is electrically connected to the detection node S, and the second electrode of the first transistor T1 is configured to output the voltage Vs of the detection node S.

The compensation sub-circuit 30 includes the second transistor T2, the third transistor T3, the fourth transistor T4, the fifth transistor T5, the sixth transistor T6 and the seventh transistor T7. Each of the third transistor T3 and the fifth transistor T5 is one of P-type transistor and N-type transistor, and each of the fourth transistor T4 and the sixth transistor T6 is another one of P-type transistor and N-type transistor.

The control electrode of the second transistor T2 is electrically connected to the compensation data signal terminal G2, the first electrode of the second transistor T2 is electrically connected to the compensation data signal terminal DLC, and the second electrode of the second transistor T2 is electrically connected to the control electrode of the third transistor T3 and the control electrode of the fourth transistor T4.

The control electrode of the third transistor T3 is also electrically connected to the second electrode of the fifth transistor T5 and the second electrode of the sixth transistor T6, the first electrode of the third transistor T3 is electrically connected to the first voltage terminal VDD1, and the second electrode of the third transistor T3 is electrically connected to the second electrode of the fourth transistor T4, the control electrode of the fifth transistor T5, the control electrode of the sixth transistor T6 and the control electrode of the seventh transistor T7.

The control electrode of the fourth transistor T4 is also electrically connected to the second electrode of the fifth transistor T5 and the second electrode of the sixth transistor T6, the first electrode of the fourth transistor T4 is electrically connected to the second voltage terminal, and the second electrode of the fourth transistor T4 is electrically connected to the control electrode of the fifth transistor T5, the control electrode of the sixth transistor T6 and the control electrode of the seventh transistor T7.

The first electrode of the fifth transistor T5 is electrically connected to the first voltage terminal VDD1, and the second electrode of the fifth transistor T5 is electrically connected to the second electrode of the sixth transistor T6.

The first electrode of the sixth transistor T6 is electrically connected to the second voltage terminal VSS1.

The first electrode of the seventh transistor T7 is electrically connected to the detection node S, and the second electrode of the seventh transistor T7 is electrically connected to the compensation output terminal OUTPUT.

Based on this, in some embodiments, referring to FIG. 5, the third transistor T3 and the fifth transistor T5 are P-type transistors, and the fourth transistor T4 and the sixth transistor T6 are N-type transistors. The first voltage signal vdd1 is a high level signal, and the second voltage signal vss1 is a low level signal. In this way, it may be ensured that the second compensation signal Data2_C received by the control electrode of the seventh transistor T7 is a continuous high level signal or a continuous low level signal.

Figure 6:
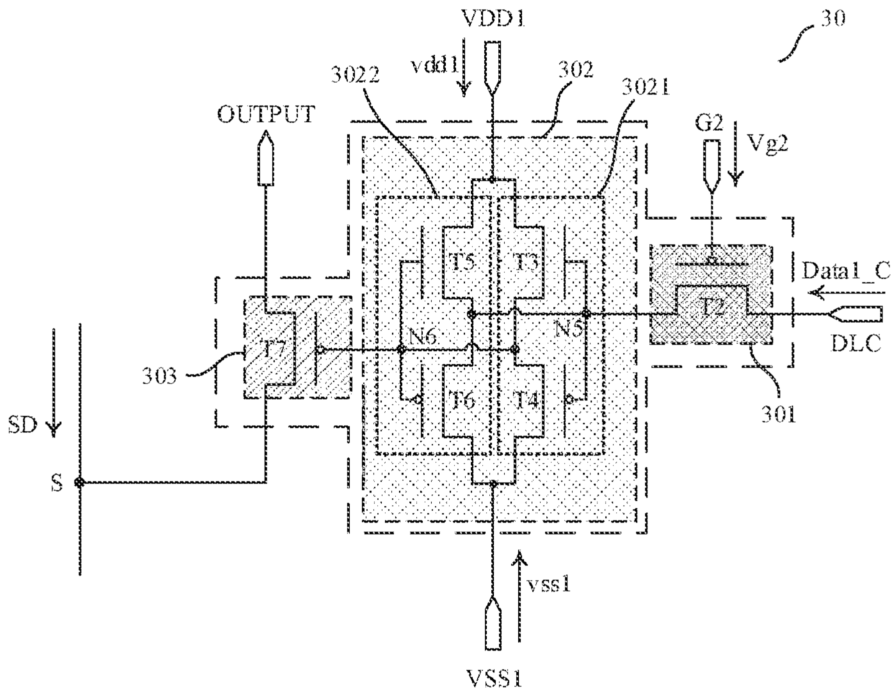
FIG. 6 is a schematic diagram of a compensation sub-circuit of a pixel driving circuit, in accordance with some embodiments of the present disclosure.

In some other embodiments, referring to FIG. 6, the third transistor T3 and the fifth transistor T5 are N-type transistors, and the fourth transistor T4 and the sixth transistor T6 are P-type transistors. The first voltage signal vdd1 is a low level signal, and the second voltage signal vss1 is a high level signal. In this way, it may be ensured that the second compensation signal Data2_C received by the control electrode of the seventh transistor T7 is a continuous high level signal or a continuous low level signal.

In some embodiments of the present disclosure, referring to FIG. 3, the driving sub-circuit 10 includes a driving signal control unit 101 and a light-emitting time control unit 102.

The driving signal control unit 101 is electrically connected to a current scanning signal terminal GL1, a light-emitting control signal terminal EL, a current data signal terminal DL1 and a light-emitting time control unit 102, and is configured to generate a driving signal SD according to a current data signal Vdc received at the current data signal terminal DL1 and in response to a current scanning signal Vgc received at the current scanning signal terminal GL1 and a light-emitting control signal Em received at the light-emitting control signal terminal EL, and to transmit the driving signal SD to the light-emitting time control unit 102.

The light-emitting time control unit 102 is electrically connected to a time scanning signal terminal GL2, a time data signal terminal DL2 and the element to be driven 02, and is configured to transmit the driving signal SD to the element to be driven 02 according to a time data signal Vdt received at the time data signal terminal DL2 and in response to a time scanning signal Vgt received at the time scanning signal terminal GL2, and to control a duration for transmitting the driving signal SD to the element to be driven 02.

In some embodiments, referring to FIG. 4, the driving signal control unit 101 includes: a current data writing subunit 1011, a first driving subunit 1012, a compensation subunit 1013, a light-emitting control subunit 1014 and an initialization subunit 1015.

The current data writing subunit 1011 is electrically connected to the current scanning signal terminal GL1, the current data signal terminal DL1 and the first driving subunit 1012, and is configured to write the current data signal Vdc into the first driving subunit 1012 in response to the current scanning signal Vgc.

The compensation subunit 1013 is electrically connected to the current scanning signal terminal GL1 and the first driving subunit 1012, and is configured to compensate the first driving subunit 1012 for a threshold voltage Vth in response to the current scanning signal Vgc.

The first driving subunit 1012 is electrically connected to the third voltage terminal VDD2 and the light-emitting control subunit 1014, and is configured to generate and output the driving signal SD according to the written current data signal Vdc and a third voltage signal vdd2 received at the third voltage terminal VDD2.

The light-emitting control subunit 1014 is electrically connected to the light-emitting control signal terminal EL, the third voltage terminal VDD2, the first driving subunit 1012 and the light-emitting time control unit 102, and is configured to transmit the driving signal SD output by the first driving subunit 1012 to the light-emitting time control unit 102 according to the third voltage signal vdd2 and in response to the light-emitting control signal Em.

The initialization subunit 1015 is electrically connected to a reset signal terminal RE, an initialization voltage terminal INIT and the first driving subunit 1012, and is configured to transmit an initialization voltage signal Vinit received at the initialization voltage terminal INIT to the first driving subunit 1012 to initialize the first driving subunit 1012 in response to a reset signal Vre received at the reset signal terminal RE.

Hereinafter, referring to FIG. 5, each subunit of the driving signal control unit 101 will be described exemplarily. Herein, for convenience of description, a connection node among the first driving subunit 1012, the compensation subunit 1013 and the initialization subunit 1015 is referred to as a first node N1; a connection node among the current data writing subunit 1011, the first driving subunit 1012, and the light-emitting control subunit 1014 is referred to as a second node N2; and a connection node among the first driving subunit 1012, the compensation subunit 1013 and the light-emitting control subunit 1014 is referred to as a third node N3.

In some embodiments, the current data writing subunit 1011 includes an eighth transistor T8. A control electrode of the eighth transistor T8 is electrically connected to the current scanning signal terminal GL1, a first electrode of the eighth transistor T8 is electrically connected to the current data signal terminal DL1, and a second electrode of the eighth transistor T8 and the first driving subunit 1012 are electrically connected to the second node N2. Herein, the eighth transistor T8 is configured to turn on a connection circuit between the current data signal terminal DL1 and the first node N1 in response to the current scanning signal Vgc.

In some embodiments, the first driving subunit 1012 includes a driving transistor Td and a first capacitor C1.

A control electrode of the driving transistor Td is electrically connected to a second terminal of the first capacitor C1; a first electrode of the driving transistor Td, the current data writing subunit 1011 and the light-emitting control subunit 1014 are electrically connected to the second node N2; and a second electrode of the driving transistor Td, the compensation subunit 1013 and the light-emitting control subunit 1014 are electrically connected to the third node N3. Herein, the driving transistor Td is configured to turn on a connection circuit between the second node N2 and the third node N3 in response to a voltage at the second terminal of the first capacitor C1.

A first terminal of the first capacitor C1 is electrically connected to the third voltage terminal VDD2, and the second terminal of the first capacitor C1 and the compensation subunit 1013 are electrically connected to the first node N1.

In some embodiments, the compensation subunit 1013 includes a ninth transistor T9. A control electrode of the ninth transistor T9 is electrically connected to the current scanning signal terminal GL1, a first electrode of the ninth transistor T9 and the first driving subunit 1012 are electrically connected to the third node N3, and a second electrode of the ninth transistor T9 and the first driving subunit 1012 are electrically connected to the first node N1. Herein, the ninth transistor T9 is configured to turn on a connection circuit between the first node N1 and the second node N3, i.e., to turn on a connection circuit between the second electrode of the driving transistor Td and the second terminal of the first capacitor C1, in response to the current scanning signal Vgc.

The light-emitting control subunit 1014 includes a tenth transistor T10 and an eleventh transistor T11.

A control electrode of the tenth transistor T10 is electrically connected to the light-emitting control signal terminal EL, a first electrode of the tenth transistor T10 is electrically connected to the third voltage terminal VDD2, and a second electrode of the tenth transistor T10 and the first driving subunit 1012 are electrically connected to the second node N2. Herein, the tenth transistor T10 is configured to turn on a connection circuit between the third voltage terminal VDD2 and the second node N2 in response to the light-emitting control signal Em.

A control electrode of the eleventh transistor T11 is electrically connected to the light-emitting control signal terminal EL, a first electrode of the eleventh transistor T11 and the first driving subunit 1012 are electrically connected to the third node N3, and a second electrode of the eleventh transistor T11 is electrically connected to the light-emitting time control unit 102. Herein, the eleventh transistor T11 is configured to turn on a connection circuit between the third node N3 and the light-emitting time control unit 102 in response to the light-emitting control signal Em.

The initialization subunit 1015 includes a twelfth transistor T12. A control electrode of the twelfth transistor T12 is electrically connected to the reset signal terminal RE, a first electrode of the twelfth transistor T12 is electrically connected to the initialization voltage terminal INIT, and a second electrode of the twelfth transistor T12 and the first driving subunit 1012 are electrically connected to the first node N1. Herein, the twelfth transistor T12 is configured to turn on a connection circuit between the initialization voltage terminal INIT and the first node N1 in response to the reset signal Vre.

In some embodiments, referring to FIG. 4, the light-emitting time control unit 102 includes a time data writing subunit 1021 and a second driving subunit 1022.

The time data writing subunit 1021 is electrically connected to the time scanning signal terminal GL2, the time data signal terminal DL2 and the second driving subunit 1022, and is configured to write the time data signal Vdt into the second driving subunit 1022 in response to the time scanning signal Vgt.

The second driving subunit 1022 is electrically connected to a common voltage terminal COM, the driving signal control unit 101 and the element to be driven 02, and is configured to transmit the driving signal SD to the element to be driven 02 according to the written time data signal Vdt and a common voltage signal Vcom received at the common voltage terminal COM.

Hereinafter, referring to FIG. 5, each subunit of the light-emitting time control unit 102 will be described exemplarily.

In some embodiments, the time data writing subunit 1021 includes a thirteenth transistor T13. A control electrode of the thirteenth transistor T13 is electrically connected to the time scanning signal terminal GL2, a first electrode of the thirteenth transistor T13 is electrically connected to the time data signal terminal DL2, and a second electrode of the thirteenth transistor T13 is electrically connected to the second driving subunit 1022. Herein, the thirteenth transistor T13 is configured to turn on a connection circuit between the time data signal terminal DL2 and the second driving subunit 1022 in response to the time scanning signal Vgt.

In some embodiments, the second driving subunit 1022 includes a fourteenth transistor T14 and a second capacitor C2.

A control electrode of the fourteenth transistor T14 is electrically connected to a first terminal of the second capacitor C2, a first electrode of the fourteenth transistor T14 is electrically connected to the light-emitting control subunit 1014, and a second electrode of the fourteenth transistor is electrically connected to the element to be driven 02.

The first terminal of the second capacitor C2 is electrically connected to the time data writing subunit 1021, and a second terminal of the second capacitor C2 is electrically connected to the common voltage terminal COM.

Hereinafter, referring to FIG. 5, the driving sub-circuit 10 included in the pixel driving circuit 01 will be described integrally and exemplarily.

The driving sub-circuit 10 includes the eighth transistor T8, the driving transistor Td, the first capacitor C1, the ninth transistor T9, the tenth transistor T10, the eleventh transistor T11, the twelfth transistor T12, the thirteenth transistor T13, the fourteenth transistor and the second capacitor C2.

The control electrode of the eighth transistor T8 is electrically connected to the current scanning signal terminal GL1, the first electrode of the eighth transistor T8 is electrically connected to the current data signal terminal DL1, and the second electrode of the eighth transistor T8 is electrically connected to the first electrode of the driving transistor Td.

The control electrode of the driving transistor Td is electrically connected to the second terminal of the first capacitor C1, the first electrode of the driving transistor Td is also electrically connected to the second electrode of the tenth transistor T10, and the second electrode of the driving transistor Td is electrically connected to the first electrode of the ninth transistor T9 and the first electrode of the eleventh transistor T11.

The first terminal of the first capacitor C1 is electrically connected to the third voltage terminal VDD2, and the second terminal of the first capacitor C1 is also electrically connected to the second electrode of the ninth transistor T9 and the second electrode of the twelfth transistor T12.

The control electrode of the ninth transistor T9 is electrically connected to the current scanning signal terminal GL1.

The control electrode of the tenth transistor T10 is electrically connected to the light-emitting control signal terminal EL, and the first electrode of the tenth transistor T10 is electrically connected to the third voltage terminal VDD2.

The control electrode of the eleventh transistor T11 is electrically connected to the light-emitting control signal terminal EL, and the second electrode of the eleventh transistor T11 is electrically connected to the first electrode of the fourteenth transistor T14.

The control electrode of the twelfth transistor T12 is electrically connected to the reset signal terminal RE, and the first electrode of the twelfth transistor T12 is electrically connected to the initialization voltage terminal INIT.

The control electrode of the thirteenth transistor T13 is electrically connected to the time scanning signal terminal GL2, the first electrode of the thirteenth transistor T13 is electrically connected to the time data signal terminal DL2, and the second electrode of the thirteenth transistor T13 is electrically connected to the first terminal of the second capacitor C2.

The first terminal of the second capacitor C2 is also electrically connected to the control electrode of the fourteenth transistor T14, and the second terminal of the second capacitor C2 is electrically connected to the common voltage terminal COM.

The second electrode of the fourteenth transistor is electrically connected to the element to be driven 02.

It will be noted that, in some embodiments, voltage values of the "first voltage signal vdd1" and the "third voltage signal vdd2" mentioned in the present disclosure may be equal, and voltage values of the "second voltage signal vss1" and a "fourth voltage signal vss2" may be equal. In this case, the first voltage terminal VDD1 and the third voltage terminal VDD2 may be a same voltage terminal, and the second voltage terminal VSS1 and the fourth voltage terminal VSS2 may be a same voltage terminal.

In addition, one of the first voltage signal vdd1 and the second voltage signal vss1 is a high level signal, and the other is a low level signal; and one of the third voltage signal vdd2 and the fourth voltage signal vss2 is a high level signal, and the other is a low level signal. A voltage value of the high level signal is greater than a voltage value of the low level signal. Herein, specific levels of the voltage signals described above are not limited, which may be set according to actual needs in use.

In some embodiments, a control electrode of each transistor used in the present disclosure is a gate of the transistor, a first electrode of each transistor is one of a source and a drain of the transistor, and a second electrode of each transistor is the other of the source and the drain of the transistor. Since the source and the drain of the transistor may be symmetrical in structure, the source and the drain of the transistor may be undifferentiated in structure. That is, the first electrode and the second electrode of the transistor in the embodiments of the present disclosure may be undifferentiated in structure. For example, in a case where the transistor is a P-type transistor, the first electrode of the transistor is the source, and the second electrode of the transistor is the drain; for example, in a case where the transistor is an N-type transistor, the first electrode of the transistor is the drain, and the second electrode of the transistor is the source.

In addition, in the embodiments of the present disclosure, the first capacitor C1 and the second capacitor C2 may be capacitive devices separately manufactured through a process, e.g., capacitive devices realized by manufacturing special capacitor electrodes, and each capacitor electrode of the capacitor may be realized by a metal layer, a semiconductor layer (e.g., doped polysilicon), and the like. The first capacitor C1 and the second capacitor C2 may also be formed by electrodes having facing areas in the transistor, or formed by electrodes of transistors and signal lines having facing areas, or formed by a plurality of signal lines having facing areas.

Figure 7:
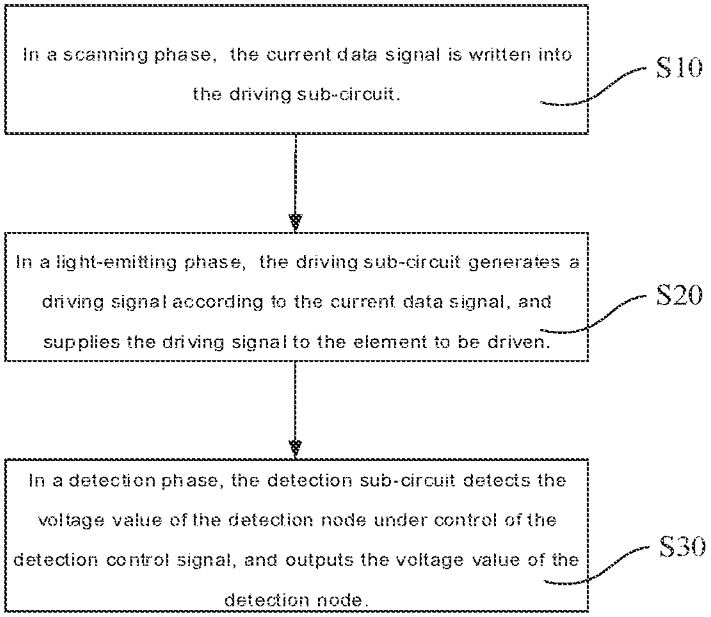
FIG. 7 is a flow diagram of a pixel driving method, in accordance with some embodiments of the present disclosure.

Some embodiments of the present disclosure also provide a pixel driving method, which is applied to any one of the pixel driving circuits 01 as described above. Referring to FIG. 7, the pixel driving method includes S10, S20 and S30.

In S10, in a scanning phase ②: the current data signal Vdc is written into the driving sub-circuit 10 of the pixel driving circuit 01.

In S20, in a light-emitting phase ④: the driving sub-circuit 10 generates a driving signal SD according to the written current data signal Vdc, and supplies the driving signal SD to the element to be driven 02 corresponding to the pixel driving circuit 01.

In S30, in a detection phase ⑤: the detection sub-circuit 20 of the pixel driving circuit 01 detects the voltage Vs of the detection node S of the pixel driving circuit 01 under control of the detection control signal Vg1, and outputs the voltage Vs of the detection node S. The detection phase ⑤ is within the light-emitting phase ④.

It is required to be ensured that after the element to be driven 02 receives the driving signal SD and enters the working state, S30 is executed to enter the detection phase ⑤ to detect the voltage Vs of the detection node S; and thus, the working state of the element to be driven may be determined by detecting the voltage Vs of the detection node S. The pixel driving method may realize the detection of the defective sub-pixel of the display apparatus without detecting the element to be driven 02, which improves the convenience and operability of the detection.

It will be noted that in a case where the detection phase ⑤ is within the light-emitting phase ④, a duration of the light-emitting phase ④ is longer than or equal to a duration of the detection phase ⑤. For example, a starting time point of transmitting the detection control signal Vg1 to the detection sub-circuit 20 is after a starting time point of supplying the driving signal SD to the element to be driven 02. In this way, after the element to be driven 02 receives the driving signal SD for a period of time, and is with a stable working state, then the voltage Vs of the detection node S is detected, so that an accuracy of the detection may be ensured, and an accuracy of the working state of the element to be driven 02 determined from the detection is high. An ending time point of transmitting the detection control signal Vg1 to the detection sub-circuit 20 is before an ending time point of supplying the driving signal SD to the element to be driven 02, or the ending time point of transmitting the detection control signal Vg1 to the detection sub-circuit 20 coincides with the ending time point of supplying the driving signal SD to the element to be driven 02. That is, it may be ensured that the duration of the light-emitting phase ④ is longer than the duration of the detection phase ⑤.

Figure 9:
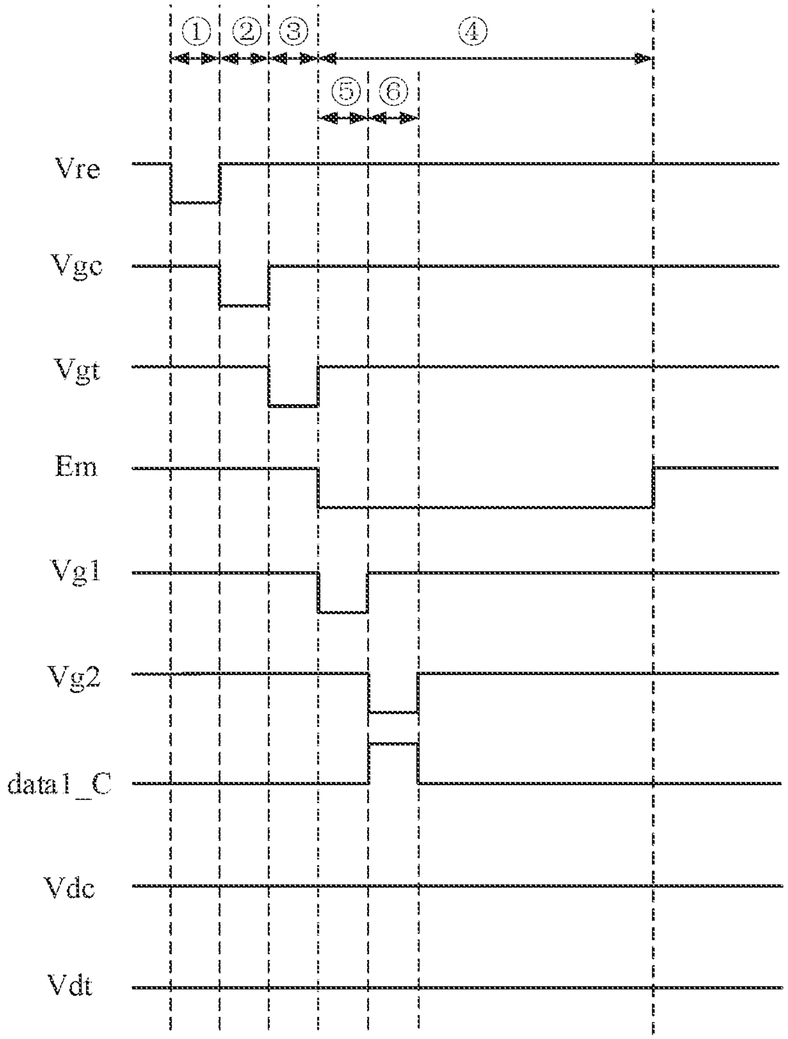
FIG. 9 is a timing signal diagram of a pixel driving method, in accordance with some embodiments of the present disclosure.

Referring to FIG. 9, the scanning phase ② in S10, the light-emitting phase ④ in S20 and the detection phase ⑤ in S30 will be described exemplarily below.

In some embodiments, as shown in FIG. 3, in a case where the driving sub-circuit 10 includes the driving signal control unit 101, in the scanning phase ②, the driving signal control unit 101 writes the current data signal Vdc under control of the current scanning signal Vgc.

For example, as shown in FIG. 4, in a case where the driving signal control unit 101 includes the current data writing subunit 1011, the first driving subunit 1012 and the compensation subunit 1013, in the scanning phase ②, the current data writing subunit 1011 writes the current data signal Vdc into the first driving subunit 1012 under the control of the current scanning signal Vgc. Then, the compensation subunit 1013 compensates the first driving subunit 1012 in voltage under the control of the current scanning signal Vgc.

For example, as shown in FIG. 5, in a case where the current data writing subunit 1011 includes the eighth transistor T8, the first driving subunit 1012 includes the driving transistor Td and the first capacitor C1, and the compensation subunit 1013 includes the ninth transistor T9, in the scanning phase ②, the eighth transistor T8 and the ninth transistor T9 receive the current scanning signal Vgc, and are turned on under the control of the current scanning signal Vgc. The eighth transistor T8 transmits the current data signal Vdc to the driving transistor Td. The driving transistor Td maintains a turn-on state under control of a voltage at the second terminal of the first capacitor C1, and transmits the current data signal Vdc to the ninth transistor T9. The ninth transistor T9 transmits the current data signal Vdc to the second terminal of the first capacitor C1. The driving transistor Td is turned off when the voltage at the second terminal of the first capacitor C1 rises to Vdc−Vth, where Vdc represents a voltage of the current data signal Vdc, and Vth represents a threshold voltage of the driving transistor Td.

In some embodiments, as shown in FIG. 3, in a case where the driving sub-circuit 10 includes the driving signal control unit 101 and the light-emitting time control unit 102, in the light-emitting phase ④, the driving signal control unit 101 generates the driving signal SD according to the written current data signal Vdc under control of the light-emitting control signal Em, and transmits the generated driving signal SD to the light-emitting time control unit 102. Then, the light-emitting time control unit 102 transmits the driving signal SD to the element to be driven 02.

For example, as shown in FIG. 4, in a case where the driving signal control unit 101 includes the first driving subunit 1012 and the light-emitting control subunit 1014, and the light-emitting time control unit 102 includes the second driving subunit 1022, in the light-emitting phase ④, the first driving subunit 1012 generates and outputs the driving signal SD according to the third voltage signal vdd2 and the written current data signal Vdc. The light-emitting control subunit 1014 transmits the driving signal SD output by the first driving subunit 1012 to the second driving subunit 1022 under the control of the light-emitting control signal Em, and the second driving subunit 1022 transmits the driving signal SD to the element to be driven 02.

For example, as shown in FIG. 5, in a case where the first driving subunit 1012 includes the driving transistor Td and the first capacitor C1, the light-emitting control subunit 1014 includes the tenth transistor T10 and the eleventh transistor T11, and the second driving subunit 1022 includes the fourteenth transistor T14 and the second capacitor C2, in the light-emitting phase ④, the tenth transistor T10 and the eleventh transistor T11 receive the light-emitting control signal Em, and are turned on under the control of the light-emitting control signal Em. The tenth transistor T10 transmits the third voltage signal vdd2 to the driving transistor Td. The driving transistor Td, with its first electrode receiving the third voltage signal vdd2 and the control electrode receiving a voltage signal from the second terminal of the first capacitor C1, generates the driving signal SD and transmits the generated driving signal SD to the eleventh transistor T11, and the turn-on eleventh transistor T11 transmits the driving signal SD to the fourteenth transistor T14. The fourteenth transistor T14 maintains a turn-on state under control of a voltage at the first terminal of the second capacitor C2, and transmits the driving signal SD to the element to be driven 02.

In some embodiments, as shown in FIG. 5, in a case where the detection sub-circuit 20 includes the first transistor T1, in the detection phase ⑤, the first transistor T1 receives the detection control signal Vg1 from the detection control signal terminal G1, and outputs the voltage Vs of the detection node S to the detection output terminal VS under the control of the detection control signal Vg1. Based on this, in some embodiments, referring to FIG. 8, before the scanning phase ② in S10, the pixel driving method further includes a following step.

In S5, in an initialization phase ①: the driving sub-circuit 10 is initialized.

In this way, it is possible to reduce or even eliminate an impact of an electrical signal having existed in the driving sub-circuit 10 on the current data signal Vdc written in a subsequent scanning phase ②, thereby reducing the impact on the driving signal SD generated in the subsequent light-emitting phase ④, and improving the accuracy of detection.

For example, as shown in FIG. 3, in a case where the driving sub-circuit 10 includes the driving signal control unit 101, in the initialization phase ①, the driving signal control unit 101 is initialized according to the initialization voltage signal Vinit under control of the reset signal Vre.

For example, as shown in FIG. 4, in a case where the driving signal control unit 101 includes the first driving subunit 1012 and the initialization subunit 1015, in the initialization phase ①, the initialization subunit 1015 transmits the initialization voltage signal Vinit to the first driving subunit 1012 under the control of the reset signal Vre, to initialize the first driving subunit 1012.

For example, as shown in FIG. 5, in a case where the initialization subunit 1015 includes the twelfth transistor T12, and the first driving subunit 1012 includes the driving transistor Td and the first capacitor C1, in the initialization phase ①, the twelfth transistor T12 receives the reset signal Vre from the reset signal terminal RE, and is turned on under the control of the reset signal Vre, and transmits the initialization voltage signal Vinit from the initialization voltage terminal INIT to the first capacitor C1 to initialize the first capacitor C1.

Figure 8:
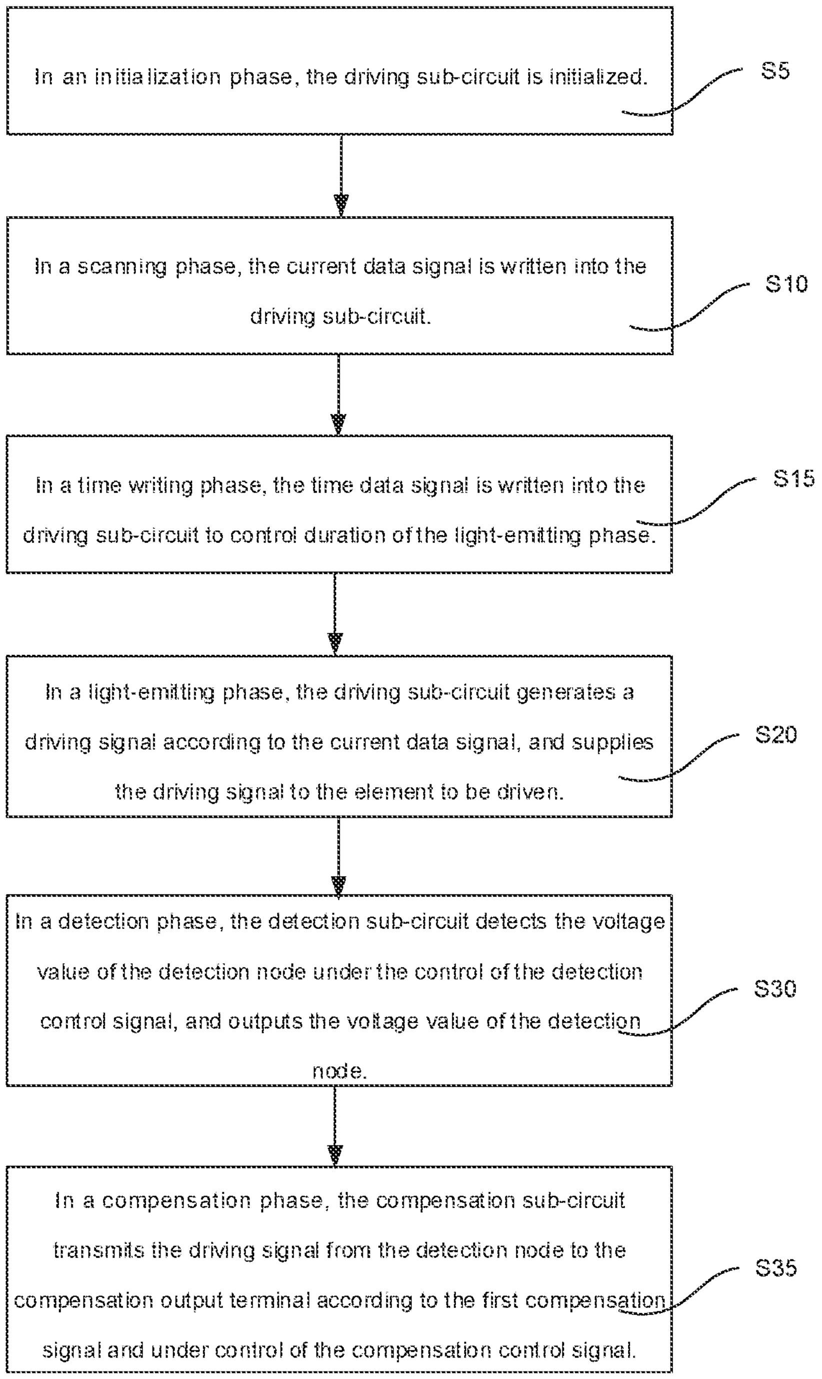
FIG. 8 is a flow diagram of another pixel driving method, in accordance with some embodiments of the present disclosure.

In some embodiments, referring to FIG. 8, before the light-emitting phase ④ in S20, the pixel driving method further includes a following step.

In S15, in a time writing phase ③: the time data signal Vdt is written into the driving sub-circuit 10 to control a duration of the light-emitting phase ④.

For example, as shown in FIG. 3, in a case where the driving sub-circuit 10 includes the light-emitting time control unit 102, in the time writing phase ③, the light-emitting time control unit 102 writes the time data signal Vdt under control of the time scanning signal Vgt to control the duration of the light-emitting phase ④ according to the written time data signal Vdt.

For example, as shown in FIG. 4, in a case where the light-emitting time control unit 102 includes the time data writing subunit 1021 and the second driving subunit 1022, in the time writing phase ③, the time data writing subunit 1021 writes the time data signal Vdt into the second driving subunit 1022 under the control of the time scanning signal Vgt, so that the second driving subunit 1022 controls the duration of the light-emitting phase ④ according to the written time data signal Vdt.

For example, as shown in FIG. 5, in a case where the time data writing subunit 1021 includes the thirteenth transistor T13, and the second driving subunit 1022 includes the fourteen transistor T14 and the second capacitor C2, in the time writing phase ③, the thirteenth transistor T13 receives the time scanning signal Vgt, and transmits the time data signal Vdt to the second capacitor C2 under the control of the time scanning signal Vgt. The second capacitor C2 receives and stores the time data signal Vdt to control a turn-on duration of the fourteenth transistor according to the stored time data signal Vdt.

Herein, by adjusting the time data signal Vdt written into the second driving subunit 1022, the turn-on duration of the fourteenth transistor may be adjusted, so that the duration for transmitting the driving signal SD to the element to be driven 02 may be controlled, that is, the duration of the light-emitting phase ④ may be controlled.

In some embodiments, as shown in FIGS. 2, 3, 4 and 5, in a case where the pixel driving circuit 01 further includes the compensation sub-circuit 30, referring to FIG. 8, after the detection phase ⑤ in S30, the pixel driving method also includes a following step.

In S35, in a compensation phase ⑥: the compensation sub-circuit 30 transmits the driving signal SD supplied by the driving sub-circuit 10 from the detection node S to the compensation output terminal OUTPUT corresponding to the pixel driving circuit 01 according to the first compensation data signal Data1_C and under control of the compensation control signal Vg2. The compensation phase ⑥ is within the light-emitting phase ④.

In this way, in a case where the element to be driven 02 electrically connected to the pixel driving circuit 01 cannot normally emit light due to the open circuit, the compensation sub-circuit 10 receives the first compensation data signal Data1_C, and transmits the driving signal SD to the compensation output terminal OUTPUT for transmission according to the received first compensation data signal Data1_C, and transmits the driving signal SD to the other elements to be driven 02' via the compensation output terminal OUTPUT, so that the other element to be driven 02' receiving the driving signal SD may be caused to emit light instead of the element to be driven 02 that cannot normally emit light due to the open circuit. Therefore, the pixels corresponding to the element to be driven 02 that is open-circuited in the display apparatus may displays normally, that is, defective pixels that are open-circuited in the display apparatus are repaired by a light emission compensation, which improves the display effect of the display apparatus, improves the reliability of the display apparatus, and prolongs the service life of the display apparatus.

It will be noted that a duration of the compensation phase ⑥ is equal to or approximately equal to a duration for the compensation sub-circuit 30 receiving the first compensation signal Data1_C under the control of the compensation control signal Vg2. In a case where the compensation phase ⑥ is within the light-emitting phase ④, the duration of the light-emitting phase ④ is longer than or equal to a sum of the duration of the detection phase ⑤ and the duration of the compensation phase ⑥.

For example, as shown in FIG. 3, in a case where the compensation sub-circuit 30 includes the input unit 301, the storage unit 303 and the compensation control unit 303, in the compensation phase ⑥, the input unit 301 writes the first compensation data signal Data1_C into the storage unit 302 under the control of the compensation control signal Vg2. Then, the storage unit 302 generates and stores the second compensation data signal Data2_C according to the written first compensation data signal Data1_C, and outputs the second compensation data signal Data2_C to the compensation control unit 303. Afterwards, the compensation control unit 303 turns on the connection circuit between the detection node S and the compensation output terminal OUTPUT under control of the second compensation data signal Data2_C.

In this way, after the compensation phase ⑥ in S6, although the compensation sub-circuit 30 stops receiving the first compensation data signal Data1_C, since the storage unit 302 can generate and store the second compensation data signal Data2_C according to the first compensation data signal Data1_C received in the compensation phase ⑥, the compensation control unit 303 may continue to receive the second compensation data signal Data2_C transmitted by the storage unit 302, thereby maintaining the turn-on state of the connection circuit between the detection node S and the compensation output terminal OUTPUT.

For example, as shown in FIG. 4, in a case where the storage unit 302 includes the first inverter 3021 and the second inverter 3022, in the compensation phase ⑥, the first inverter 3021 receives the written first compensation data signal Data1_C, the first voltage signal vdd1 and the second voltage signal vss1, generates the second compensation data signal Data2_C according to the first compensation data signal Data1_C, the first voltage signal vdd1 and the second voltage signal vss1, and transmits the generated second compensation data signal Data2_C to the compensation control unit 303 and the second inverter 3022. The second inverter 3022 receives the second compensation data signal Data2_C, the first voltage signal vdd1 and the second voltage signal vss1, and generates a third compensation data signal Data3_C according to the second compensation data signal Data2_C, the first voltage signal vdd1 and the second voltage signal vss1, so that the first inverter 3021 continuously generates the second compensation data signal Data2_C and continuously transmits the second compensation data signal Data2_C to the compensation control unit 303 and the second inverter 3022 to generate the third compensation data signal Data3_C, and the generated third compensation data signal Data3_C is transmitted to the first inverter 3021, so that the first inverter 3021 continuously generates the second compensation data signal Data2_C and continuously transmits the second compensation data signal Data2_C to the compensation control unit 303 and the second inverter 3022.

Herein, the level of the first compensation data signal Data1_C and the level of the third compensation data signal Data3_C are a same one of the low level and the high level. Therefore, the second inverter 3022 may continuously generate the second compensation data signal Data2_C when receiving the third compensation data signal Data3_C.

For example, as shown in FIG. 5, the input unit 301 includes the second transistor T2, the first inverter 3021 includes the third transistor T3 and the fourth transistor T4, the second inverter 3022 includes the fifth transistor T5 and the sixth transistor T6, and the compensation control unit 303 includes the seventh transistor T7. In this case, referring to FIG. 9, by taking an example where the first voltage signal vdd1 is a high level signal, the second voltage signal vss1 is a low level signal, and the first compensation data signal Data1_C is a high level signal, in the compensation phase ⑥, the second transistor T2 receives the compensation control signal Vg2, and is turned on under the control of the compensation control signal Vg2, so as to transmit the first compensation data signal Data1_C to the third transistor T3 and the fourth transistor T4. The third transistor T3 is turned off under control of the first compensation data signal Data1_C, and the fourth transistor T4 is turned on under the control of the first compensation data signal Data1_C. The fourth transistor T4 transmits the second voltage signal vss1 to the fifth transistor T5, the sixth transistor T6 and the seventh transistor T7. The fifth transistor T5 is turned on, the sixth transistor T6 is turned off, and the seventh transistor T7 is turned on. The fifth transistor T5 transmits the first voltage signal vdd1 to the third transistor T3 and the fourth transistor T4, so that the third transistor T3 maintains a turn-on state, the fourth transistor T4 maintains a turn-off state, which maintains states of the fifth transistor T5 and the sixth transistor T6. Therefore, the third transistor T3 may continuously transmit the second voltage signal vss1 to the seventh transistor T7, so that the seventh transistor T7 maintains a turn-on state. The turn-on seventh transistor T7 transmits the driving signal SD from the detection node S to the compensation output terminal OUTPUT.

Hereinafter, referring to FIG. 9, the pixel driving method provided in some embodiments of the present disclosure will be described integrally and exemplarily by taking the pixel driving circuit 01 shown in FIG. 5 as an example.

The pixel driving circuit 01 shown in FIG. 5 includes the first transistor T1 to the fourteenth transistor T14, the first capacitor C1 and the second capacitor C2.

In addition, for convenience of illustration, the second terminal of the first capacitor C1, the second electrode of the driving transistor Td, the second electrode of the ninth transistor T9 and the second electrode of the twelfth transistor T12 are equivalently connected to the first node N1; the second electrode of the tenth transistor T10, the first electrode of the driving transistor Td and the second electrode of the eighth transistor T8 are equivalently connected to the second node N2; the second electrode of the driving transistor Td, the first electrode of the ninth transistor T9 and the first electrode of the eleventh transistor T11 are equivalently connected to the third node N3; a connection node among the second electrode of the thirteenth transistor T13, the first terminal of the second capacitor C2 and the control electrode of the fourteenth transistor is referred to as a fourth node; the second electrode of the second transistor T2, the control electrode of the third transistor T3, the control electrode of the fourth transistor T4, the second electrode of the fifth transistor T5 and the second electrode of the sixth transistor T6 are equivalently connected to a fifth node N5; the second electrode of the third transistor T3, the second electrode of the fourth transistor T4, the control electrode of the fifth transistor T5, the control electrode of the sixth transistor T6 and the control electrode of seven transistor T7 are equivalently connected to a sixth node N6.

It will be noted that, among the first transistor T1 to the fourteenth transistor T14 included in the pixel driving circuit 01 in FIG. 5, except that the fourth transistor T4 and the sixth transistor T6 are N-type transistors, remaining transistors are all P-type transistors, which will not serve as a limitation on the present disclosure.

The N-type transistor is turned on in a case where its control electrode receives a high level signal, and is turned off in a case where its control electrode receives a low level signal. The P-type transistor is turned on in a case where its control electrode receives a low level signal, and is turned off in a case where its control electrode receives a high level signal.

In addition, FIG. 9 shows a timing signal diagram corresponding to the pixel driving circuit 01 in FIG. 5. For example, if the first transistor T1 in FIG. 5 is a P-type transistor, the control electrode of the first transistor T1 receives a low signal when the first transistor T1 is required to be turned on. However, in some other embodiments of the present disclosure, in a case where the first transistor T1 is an N-type transistor, a signal that controls the first transistor T1 to be turned on should be changed to a high level signal accordingly.

Correspondingly, the first voltage signal vdd1 output from the first voltage terminal VDD1 and the third voltage signal vdd2 output from the third voltage terminal VDD2 are both high level signals, and the second voltage signal vss1 output from the second voltage terminal VSS1 and the fourth voltage signal vss2 output from the fourth voltage terminal VSS2 are both low level signals, which will also not serve as a limitation on the present disclosure.

In the initialization phase ①, the reset signal Vre output from the reset signal terminal RE is of a low level, and the twelfth transistor T12 is turned on to transmit the initialization voltage signal Vinit from the initialization voltage terminal INIT to the second terminal of the first capacitor C1, and a voltage of the first node N1 is equal to Vinit; and the first terminal of the first capacitor C1 is connected to the third voltage terminal VDD2. The first capacitor C1 is initialized.

It will be noted that the initialization voltage signal Vinit is a low level signal herein. Therefore, a voltage Vg of the control electrode of the driving transistor Td is equal to Vinit, and the driving transistor Td is turned on in the initialization phase ①.

In the scanning phase ②, the current scanning signal Vgc output from the current scanning signal terminal GL1 is of a low level, the eighth transistor T8 and the ninth transistor T9 are turned on, and the driving transistor Td maintains the turn-on state in the previous phase.

The current data signal Vdc output from the current data signal terminal DL1 is transmitted to the second terminal of the first capacitor C1 through the eighth transistor T8, the driving transistor Td and the ninth transistor T9 that are turned on. Herein, the voltage of the current data signal Vdc is higher than a voltage of the initialization voltage signal Vinit, and thus the current data signal terminal DL1 discharges to the second terminal of the first capacitor C1. Until a voltage value of the first node N1 rises to Vdc−Vth, the voltage Vg of the control electrode of the driving transistor Td is equal to Vdc−Vth, a voltage V1 of the first electrode of the driving transistor Td is equal to Vdc, the driving transistor Td is turned off, and the current data signal terminal DL1 stops discharging to the second terminal of the first capacitor C1. In this case, the voltage of the first node N1 is equal to Vdc−Vth, where Vth is the threshold voltage of the driving transistor Td.

In this way, the writing of the current data signal Vdc and compensation for the threshold voltage Vth are achieved in the scanning phase ③.

In the time writing phase ③, the time scanning signal Vgt output from the time scanning signal terminal GL2 is of a low level, the thirteenth transistor T13 is turned on, the time data signal Vdt from the time data signal terminal DL2 is transmitted to the first terminal of the second capacitor C2, a voltage value of the fourth node N4 is equal to a voltage Vdt of the time data signal Vdt, and the fourteenth transistor T14 is turned on.

In the light-emitting phase ④, the light-emitting control signal Em output from the light-emitting control signal terminal EL is of a low level, the tenth transistor T10 and the eleventh transistor T11 are turned on, the third voltage signal vdd2 is transmitted from the turn-on tenth transistor T10 to the second node N2, a voltage value of the second node N2 is VDD2, the voltage value of the first node N1 is still Vdc−Vth, a difference between the voltage of the first electrode of the driving transistor Td and the voltage of the control electrode of the driving transistor Td is VDD2−Vdc+Vth, which is greater than the threshold voltage Vth, and the driving transistor Td is turned on and generates the driving signal SD. The driving signal SD is transmitted from the turn-on eleventh transistor T11 to the first electrode of the fourteenth transistor T14. The fourteenth transistor T14 still maintains the turn-on state in the light-emitting phase ④, and thus the driving signal SD is transmitted from the turn-on fourteenth transistor T14 to the element to be driven 02.

It will be noted that, since a voltage of the first terminal of the second capacitor C2 is Vdt in the time writing phase ③, the time scanning signal Vgt is of a high level in the light-emitting phase ④, and after the thirteenth transistor T13 is turned off, a voltage value of the first terminal of the second capacitor C2 is still equal to Vdt, that is, the voltage value of the fourth node N4 is Vdt, the fourteenth transistor T14 is still turned on until part of the current of the driving signal SD flows from the first electrode of the fourteenth transistor T14 to the control electrode thereof, so that the voltage of the first terminal of the second capacitor C2 is increased and a voltage of the fourth node N4 is increased to turn off the fourteenth transistor T14, and in this case, the fourteenth transistor T14 no longer transmits the driving signal SD to the element to be driven 02.

In the detection phase ⑤, the detection control signal Vg1 output from the detection control signal terminal G1 is a low level signal, the first transistor T1 is turned on, and the voltage Vs of the detection node S may be detected through the second electrode of the first transistor T1.

In the compensation phase ⑥, the compensation control signal Vg2 output from the compensation data signal terminal G2 is a low level signal, the first compensation data signal Data1_C is a high level signal, the second transistor T2 is turned on, and the first compensation data signal Data1_C from the compensation data signal terminal DLC is transmitted to the fifth node N5 from the turn-on second transistor T2.

When the third transistor T3 is turned off and the fourth transistor T4 is turned on, the second voltage signal vss1 from the second voltage terminal VSS1 is transmitted from the turn-on fourth transistor T4 to the sixth node N6. A voltage of the sixth node N6 is a low level voltage, the fifth transistor T5 is turned on, the sixth transistor T6 is turned off, and the seventh transistor T7 is turned on. The turn-on seventh transistor T7 transmits the driving signal SD transmitted to the detection node S to the compensation output terminal OUTPUT. The first voltage signal vdd1 from the first voltage terminal VDD1 is transmitted from the turn-on fifth transistor T5 to the fifth node N5, and a voltage of the fifth node N5 is a high level voltage, so that the third transistor T3 to the seventh transistor T7 maintain their own turn-on or turn-off state in the compensation phase ⑥.

Figure 10:
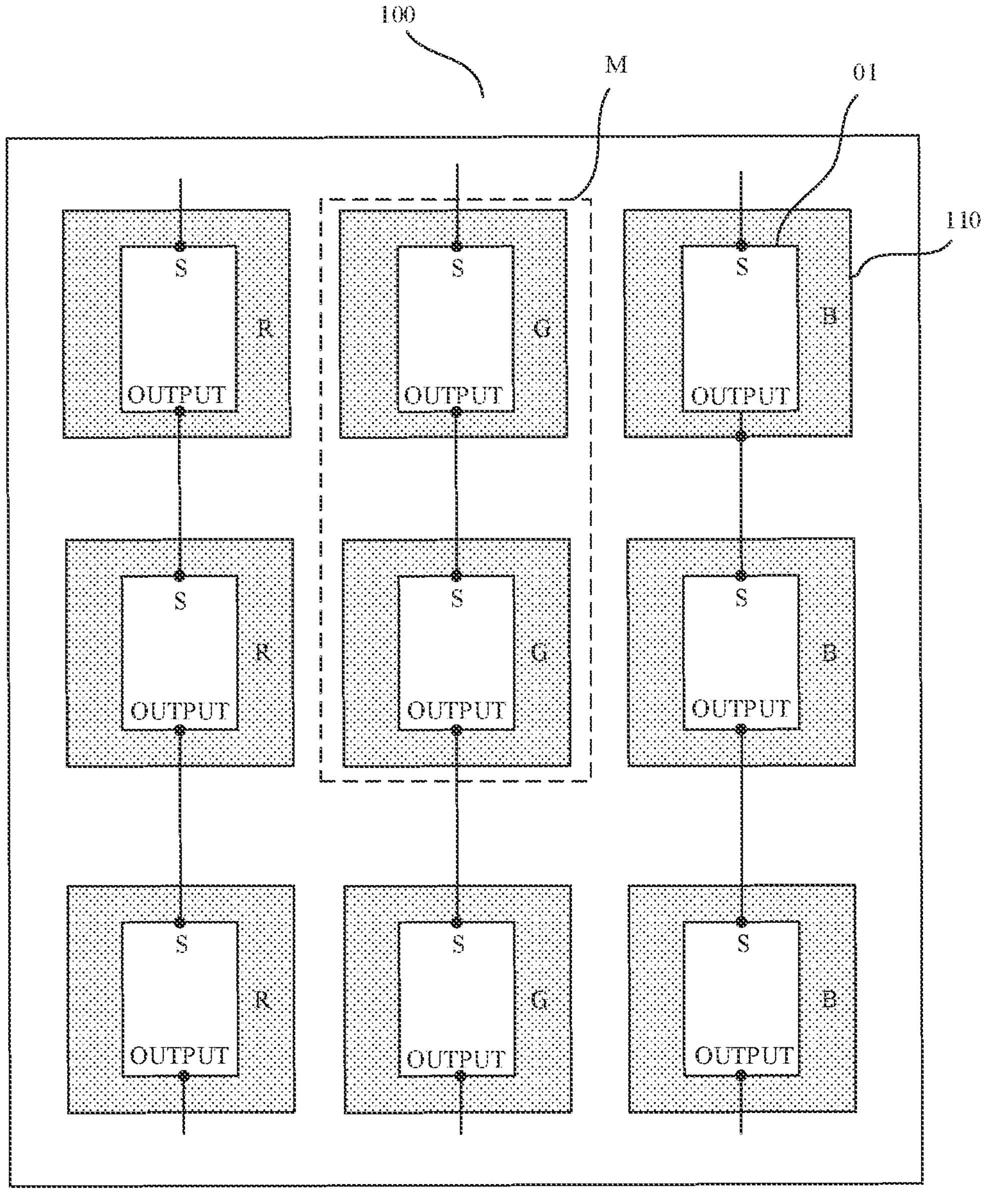
FIG. 10 is a schematic diagram showing a structure of a display panel, in accordance with some embodiments of the present disclosure.

Some embodiments of the present disclosure also provide a display panel 100. Referring to FIG. 10, the display panel 100 includes a plurality of sub-pixels 110, and at least one sub-pixel 110 of the plurality of sub-pixels 110 includes any pixel driving circuit 01 as described above.

It will be noted that each sub-pixel 110 of the display panel 100 further includes the element to be driven 02. Herein, a type and a number of the elements to be driven 02 are not limited. For example, the number of the elements to be driven 02 in each sub-pixel 110 may be set according to actual use requirements.

For example, the number of the elements to be driven 02 included in each sub-pixel 110 is two. Compared with a solution in which the sub-pixel 110 includes only one element to be driven 02, a probability that both elements to be driven 02 in the sub-pixel 100 are short-circuited is small. In this way, a probability that a short circuit occurs between the third voltage terminal VDD2 and the fourth voltage terminal VSS2 of the display panel 100 is reduced, thereby improving a reliability of the display panel 100.

For example, the element to be driven 02 includes at least one light-emitting diode (abbreviated as LED). For example, the element to be driven 02 includes at least one micro light-emitting diode (abbreviated as Micro LED). It will be noted that the micro light-emitting diode is an inorganic light-emitting diode, and the micro light-emitting diode may also be referred to as a micro inorganic light-emitting diode.

As another example, the element 02 to be driven may also include at least one organic light-emitting diode (abbreviated as OLED), at least one mini light-emitting diode (abbreviated as Mini LED), at least one micro light-emitting diode (abbreviated as Micro LED) or at least one quantum dot light-emitting diode (abbreviated as QLED), or other types of light-emitting devices.

In some embodiments, in a case where the pixel driving circuit 01 includes the compensation sub-circuit 30, referring to FIG. 10, the compensation output terminal OUTPUT corresponding to each sub-pixel 110 of the at least one sub-pixel 110 is electrically connected to a detection node S of a pixel driving circuit 01 of a sub-pixel 110 that emits the same color as and is adjacent to the sub-pixel 1101.

Hereinafter, referring to FIG. 11, the above contents will be exemplarily introduced. For the convenience of introduction, two adjacent sub-pixels 110 emitting the same color are referred to as a sub-pixel 1101 and a sub-pixel 1102.

The pixel driving circuit 01 of the sub-pixel 1101 includes a compensation sub-circuit 30, and the compensation output terminal OUTPUT of the sub-pixel 1101 is electrically connected to a detection node S of a pixel driving circuit 01 of the sub-pixel 1102 that emits the same color as and is adjacent to the sub-pixel 1101. In this way, in a case where the element to be driven 02 of the sub-pixel 1101 is open-circuited, the element to be driven 02' of the sub-pixel 1102 may receive a driving signal SD of the defective sub-pixel 1101, causing the sub-pixel 1102 to replace the defective sub-pixel 1101 to emit light. Therefore, a pixel corresponding to the defective sub-pixel 1101 may be displayed normally, that is, the pixel having the defective sub-pixel 1101 that is open-circuited in the display apparatus is repaired due to light emission compensation, which improves the display effect of the display apparatus, improves the reliability of the display apparatus, and prolongs the service life of the display apparatus.

In some embodiments, with continued reference to FIGS. 10 and 11, the plurality of sub-pixels 110 of the display panel 100 are arranged in an array, and the plurality of sub-pixels 110 arranged in the array includes a plurality of rows of sub-pixels 110 emitting a same color (not shown) or a plurality of columns of sub-pixels 110 emitting a same color. In each row of sub-pixels 110 emitting the same color (not shown) or each column of sub-pixels 110 emitting the same color, a compensation output terminal OUTPUT corresponding to one of every two adjacent sub-pixels 110 is electrically connected to a detection node S of a pixel driving circuit 01 of the other of the two adjacent sub-pixels 110.

Herein, FIG. 10 shows an example in which the plurality of sub-pixels 110 include a plurality of columns of sub-pixels 110 emitting the same color (red sub-pixel columns, green sub-pixel columns or blue sub-pixel columns), which will not serve as a limitation on the present disclosure.

Figure 12:
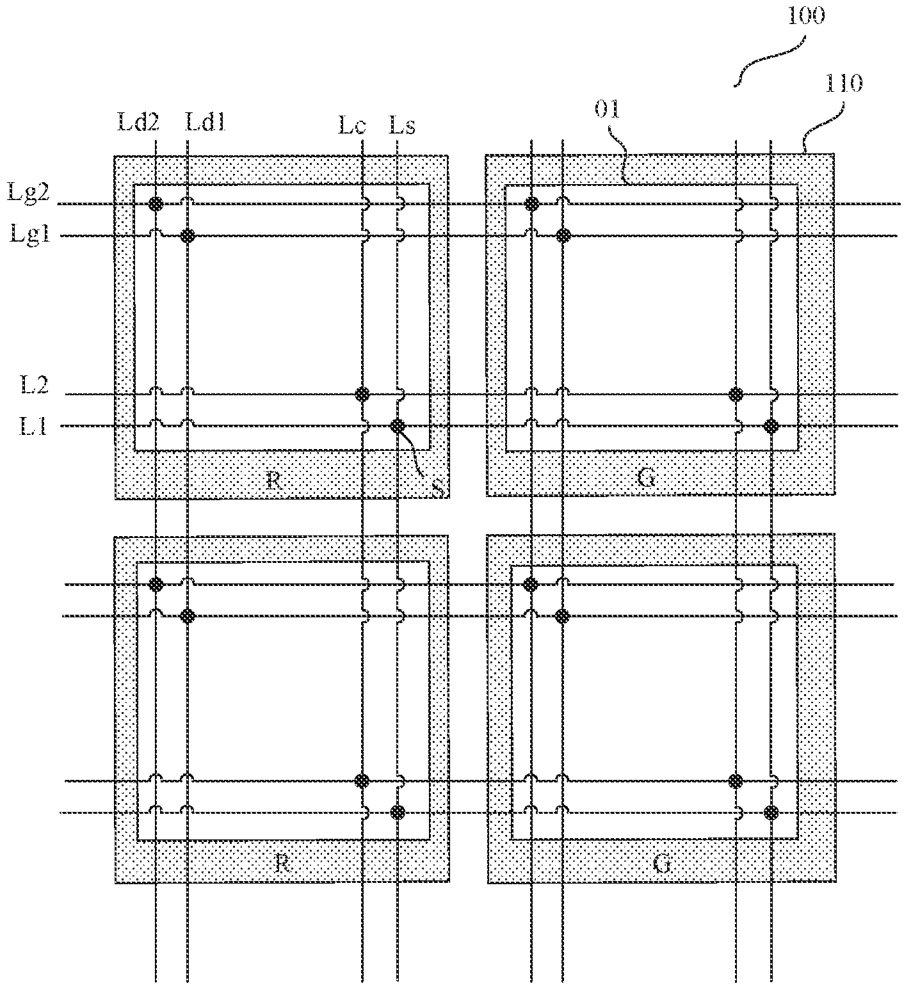
FIG. 12 is a schematic diagram showing a structure of another display panel, in accordance with some embodiments of the present disclosure.

In some embodiments, the plurality of sub-pixels 110 of the display panel 100 are arranged in an array. Referring to FIG. 12, the display panel 100 further includes: a plurality of current scanning signal lines Lg1, a plurality of current data signal lines Ld1, a plurality of time scanning signal line Lg2, a plurality of time data signal lines Ld2, a plurality of detection control signal lines L1, a plurality of compensation control signal lines L2, a plurality of detection voltage output lines Ls, and a plurality of compensation data signal lines Lc. The pixel driving circuits 01 of each column of sub-pixels 110 are electrically connected to one current data signal line Ld1, one time data signal line Ld2, one detection voltage output line Ls and one compensation data signal line Lc correspondingly. The pixel driving circuits 01 of each row of sub-pixels 110 are electrically connected to one current scanning signal line Lg1, one time scanning signal line Lg2, one detection control signal line L1 and one compensation control signal line L2 correspondingly.

The detection voltage output line Ls and the compensation data signal line Lc are two different signal lines.

Figure 13:
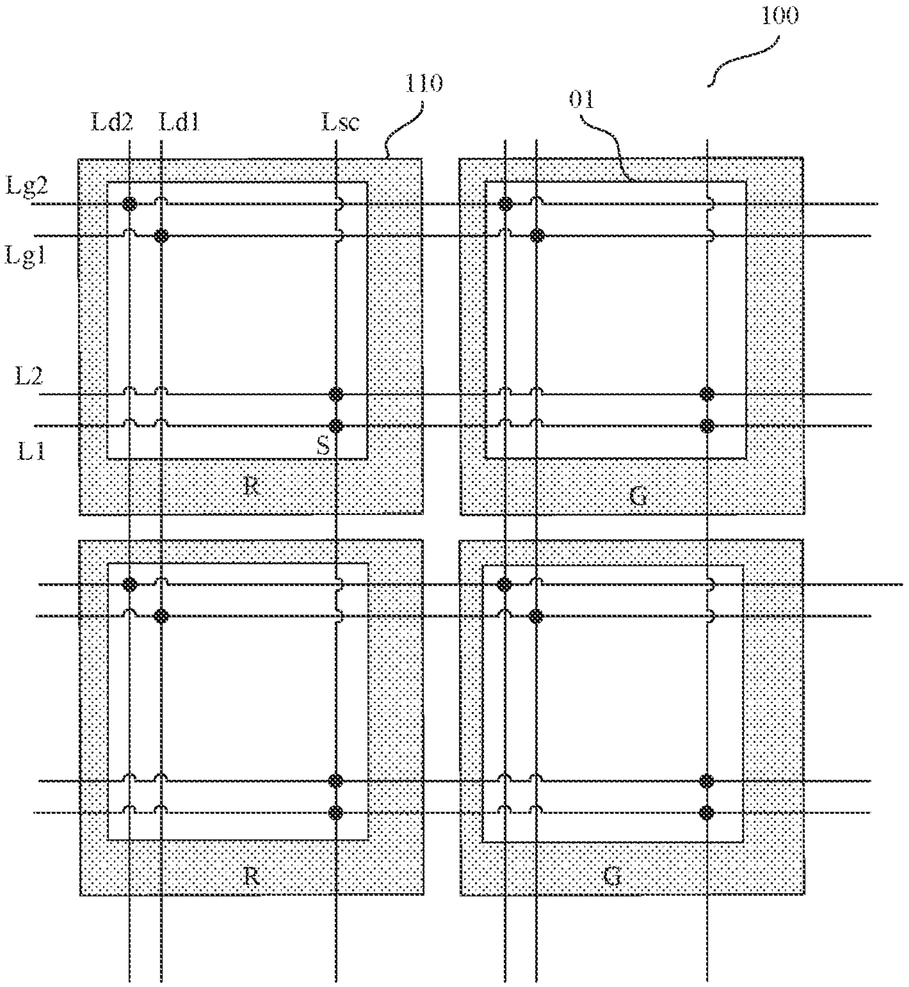
FIG. 13 is a schematic diagram showing a structure of yet another display panel, in accordance with some embodiments of the present disclosure.

In some other embodiments, referring to FIG. 13, the compensation data signal terminal DLC and the detection output terminal VS in the display panel 100 share a same detection compensation signal line Lsc. Herein, in a process of driving each sub-pixel 110, the detection phase and the compensation phase need to be performed in different time periods. That is, the detection compensation signal line Lsc is used repeatedly in different time periods. In the detection phase, the detection compensation signal line Lsc serves to output the voltage Vs of the detection node S; and in the compensation phase, the detection compensation signal line Lsc serves to transmit the first compensation data signal Data1_C. In this way, the number of signal lines on the display panel 100 may be reduced, thereby reducing a wiring space and increasing an aperture ratio of the display panel 100.

Figure 14:
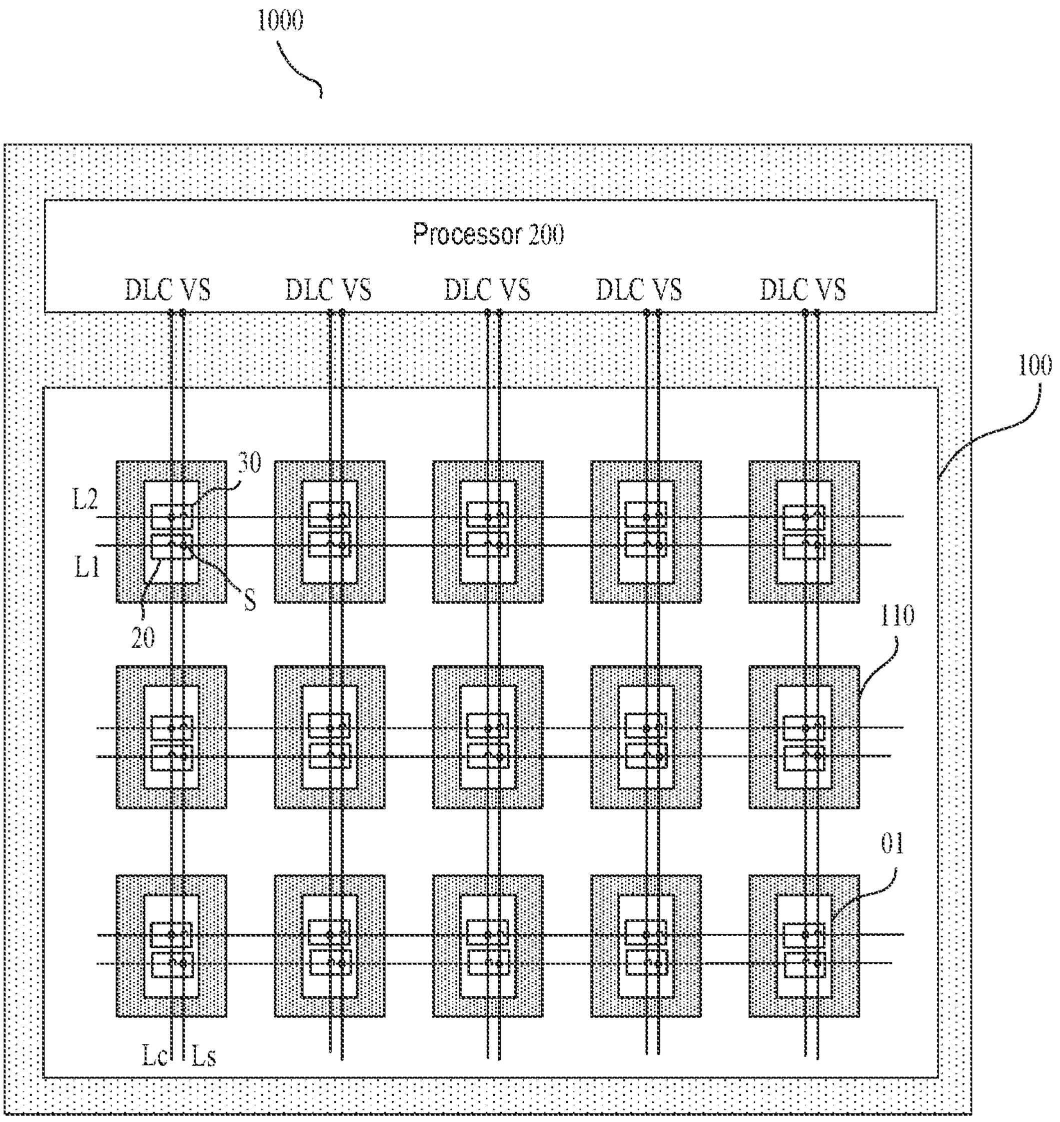
FIG. 14 is a schematic diagram showing a structure of a display apparatus, in accordance with some embodiments of the present disclosure.
Figure 15:
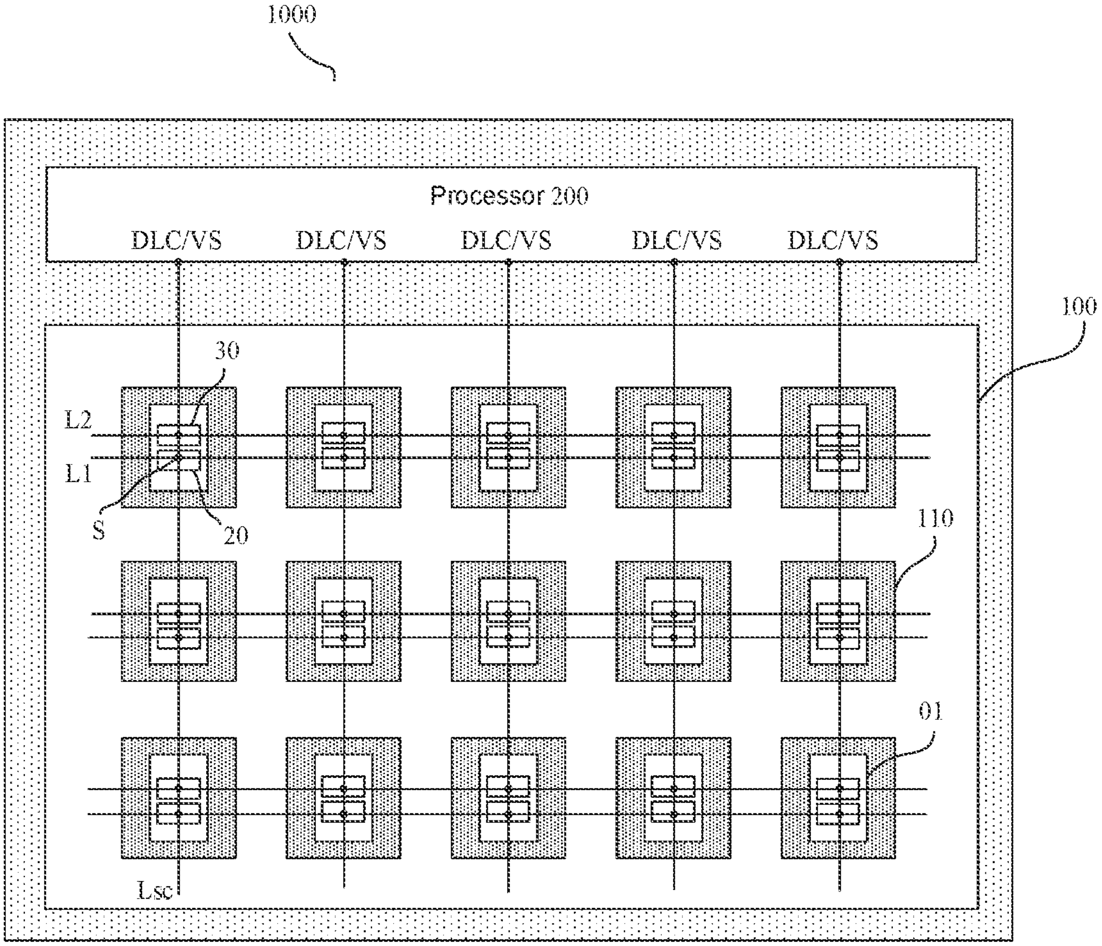
FIG. 15 is a schematic diagram showing a structure of another display apparatus, in accordance with some embodiments of the present disclosure.

Some embodiments of the present disclosure also provide a display apparatus 1000. Referring to FIGS. 14 and 15, the display apparatus 1000 includes any one of the display panels 100 as described above. The display apparatus 1000 further includes a processor 200, and the processor 200 is electrically connected to the detection sub-circuit 20 of the pixel driving circuit 01 of at least one sub-pixel 110 of the display panel 100. The processor 200 is configured to transmit the detection control signal Vg1 to the detection sub-circuit 10 connected thereto, and is also configured to receive the voltage Vs of the detection node S detected by the detection sub-circuit 10 connected thereto, and to determine the working state of the corresponding element to be driven 02 according to the voltage Vs of the detection node S.

Based on this, in some embodiments, in a case where the pixel driving circuit 01 of the at least one sub-pixel 110 of the display panel 100 further includes the compensation sub-circuit 30, the processor 200 is further electrically connected to the compensation sub-circuit 30 in each pixel driving circuit 01. The processor 200 is also configured to transmit the compensation control signal Vg1 and the first compensation data signal Data1_C to the corresponding compensation sub-circuit 30 in a case where it is determined that the working state of the corresponding element to be driven 02 is open-circuited.

In some embodiments, referring to FIG. 14, the detection voltage output line Ls and the compensation data signal line Lc corresponding to each row of sub-pixels 110 emitting the same color (not shown) or each column of sub-pixels 110 emitting the same color in the display panel 100 are two different signal lines.

In some other embodiments, referring to FIG. 15, the compensation data signal terminal DLC and the detection output terminal VS corresponding to each row of sub-pixels 110 emitting the same color (not shown) or each column of sub-pixels 110 emitting the same color in the display panel 100 share a detection compensation signal line Lsc, and the detection compensation signal line Lsc is used repeatedly in different time periods. In this way, the number of signal lines on the display panel 100 may be reduced, thereby increasing an aperture ratio of the display apparatus 1000.

Figure 16:
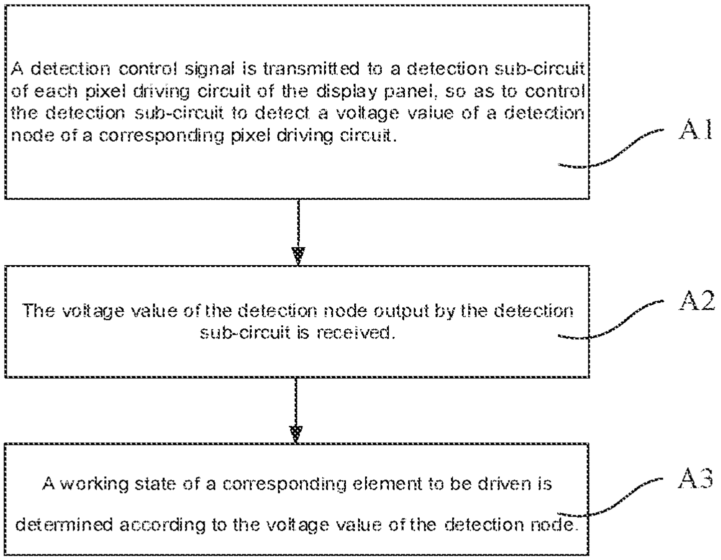
FIG. 16 is a schematic diagram showing steps of a method for controlling a display apparatus, in accordance with some embodiments of the present disclosure.

Some embodiments of the present disclosure also provide a method for controlling a display apparatus, which is applied to any one of the display apparatuses 100 as described above. Referring to FIG. 16, the method for controlling the display apparatus includes following steps.

In A1, a detection control signal Vg1 is transmitted to a detection sub-circuit 20 of each pixel driving circuit 01 of the display panel 100, so as to control the detection sub-circuit 20 to detect a voltage Vs of a detection node S of a corresponding pixel driving circuit 01.

In A2, the voltage Vs of the detection node S output by the detection sub-circuit 20 is received.

In A3, a working state of a corresponding element to be driven 02 is determined according to the voltage Vs of the detection node S.

Based on this, in some embodiments, referring to the pixel driving circuit 01 in FIG. 4, in a case where one terminal of the element to be driven 02 is electrically connected to the third voltage terminal VDD2 via the driving sub-circuit 10 of the respective pixel driving circuit 01, and the other terminal of the element to be driven 02 is electrically connected to the fourth voltage terminal VSS2, the determining of the working state of the corresponding element to be driven 02 according to the voltage Vs of the detection node S in A3 includes following situations A31 to A33.

In A31, if the voltage Vs of the detection node S is equal to or approximately equal to a difference between a voltage value of the fourth voltage signal vss2 received at the fourth voltage terminal VSS2 and the voltage division value of the element to be driven 02, it is determined that the working state of the element to be driven 02 is normal.

In A32, if the voltage Vs of the detection node S is equal to or approximately equal to a voltage value of the third voltage signal vdd2 received at the third voltage terminal VDD2, it is determined that the working state of the element to be driven 02 is open-circuited.

In A33, if the voltage Vs of the detection node S is less than the voltage value of the third voltage signal vdd2 and greater than or equal to the voltage value of the fourth voltage signal vss2, it is determined that the working state of the element to be driven 02 is short-circuited.

For example, there are at least two elements to be driven 02, and in a case where it is determined that the working state of the element to be driven 02 is short-circuited, A33 includes following situations A331 to A332.

In A331, if the voltage Vs of the detection node S is less than the voltage value of the third voltage signal vdd2 and greater than the voltage value of the fourth voltage signal vss2, it is determined that the working state(s) of at least one of the at least two elements to be driven 02 are short-circuited.

In A331, if the voltage Vs of the detection node S is equal to the voltage value of the fourth voltage signal vss2, it is determined that the working states of the at least two elements to be driven 02 are both/all short-circuited.

Referring to FIG. 5, A31 to A33 will be described below by taking an example in which the element to be driven 02 includes two micro light-emitting diodes. In a case where the third voltage signal vdd2 is 3V and the fourth voltage signal vss2 is −3V, if the detected voltage Vs of the detection node S is equal to or approximately equal to 0V, it is determined that the working states of the two micro light-emitting diodes are normal; if the detected voltage Vs of the detection node S is equal to or approximately equal to 3V, it is determined that the working state(s) of at least one of the two micro light-emitting diodes are open-circuited; if the detected voltage Vs of the detection node S is equal to or approximately equal to −1.5V, it is determined that the working state of one of the two micro light-emitting diodes is short-circuited; and if the detected voltage Vs of the detection node S is equal to or approximately equal to −3V, it is determined that the working states of the two micro light-emitting diodes are both short-circuited.

In some embodiments, referring to FIGS. 14 and 15, the pixel driving circuit(s) 01 of at least one sub-pixel 110 of the display panel 100 further include the compensation sub-circuit 30. In a case where the compensation output terminal OUTPUT corresponding to each sub-pixel 110 of the at least one sub-pixel 110 is electrically connected to a detection node S of a pixel drive circuit 01 of a sub-pixel 110 that emits the same color as and is adjacent to the sub-pixel 110, the method for controlling the display apparatus further includes the following steps.

In a case where it is determined that the working state of the element to be driven 02 is open-circuited, the compensation control signal Vg1 and the first compensation data signal Data1_C are generated, and the compensation control signal Vg1 and the first compensation data signal Data1_C are transmitted to the corresponding compensation sub-circuit 30, so that the compensation sub-circuit 30 is controlled to transmit the driving signal SD supplied by the corresponding driving sub-circuit 01 from the corresponding detection node S to the detection node S of the pixel driving circuit 01 of a sub-pixel 110 that emits the same color as and is the adjacent to the sub-pixel 110 to which the compensation sub-circuit 30 belongs.

It will be noted that the first compensation data signal Data1_C includes two types of levels: a working level and a non-working level. In a case where it is determined by detecting the voltage Vs of the detection node S that the working state of the element to be driven 02 is short-circuited or open-circuited, the first compensation data signal Data1_C is a working level. After receiving the first compensation data signal Data1_C that is the working level, the compensation sub-circuit 30 transmits the driving signal SD to a sub-pixel 110 that emits the same color as and is the adjacent to the sub-pixel 110 to which the compensation sub-circuit 30 belongs.

However, in a case where it is determined by detecting the voltage Vs of the detection node S that the working state of the element to be driven 02 is not short-circuited or open-circuited, the first compensation data signal Data1_C is a non-working level. After receiving the first compensation data signal Data1_C that is the non-working level, the compensation sub-circuit 30 no longer transmits the driving signal SD to a sub-pixel 110 that emits the same color as and is the adjacent to the sub-pixel 110 to which the compensation sub-circuit 30 belongs.

In some embodiments, the transmitting of the detection control signal Vg1 to the detection sub-circuit 20 of the pixel driving circuit 01 of the display panel 100 in A1 includes following steps A11 to A12.

In A11, a detection control signal Vg1 is generated at a set timing.

In A12, the generated detection control signal Vg1 is transmitted to each detection sub-circuit 20.

The set timing includes: at least one of a time when the display apparatus 1000 is turned on for use every time or a time when each preset use time period T is expired.

In this way, each sub-pixel 110 of the display apparatus 1000 is detected according to a certain set timing, and when a defective sub-pixel appears in the sub-pixel 110, the defective sub-pixel may be detected in time and the defective sub-pixel may be replaced in time to emit light, thereby further ensuring the display effect of the display apparatus 1000.

In some embodiments, in a use process of the display apparatus 1000, a detection compensation period and an image display period are included, and the method for controlling the display apparatus is performed during the detection compensation period. For example, the detection compensation period includes at least one image frame, and the method for controlling the display apparatus is performed within one of the at least one image frame of the detection compensation period.

After the detection compensation period, the image display period follows, and the image display period includes a plurality of image frames. During the image display period, the pixel driving circuit 01 corresponding to the defective sub-pixel that has been replaced to emit light in the sub-pixel 110 keeps transmitting the driving signal SD to the sub-pixel 110 that replaces the defective sub-pixel to emit light, so that a pixel corresponding to the defective sub-pixel may realize a normal image display during the image display period due to the light emission compensation.

In some embodiments, respective image frame of the image display period includes: an initialization phase ①, a scanning phase ②, a time writing phase ③ and a light-emitting phase ④.

Figure 17:
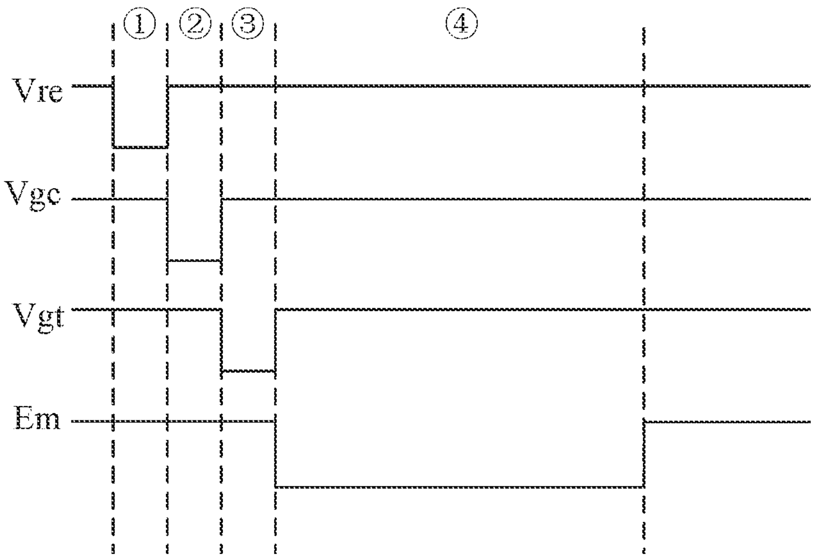
FIG. 17 is a timing signal diagram of an image display phase of a display apparatus, in accordance with some embodiments of the present disclosure.

For example, referring to FIG. 17, within each image frame of the image display period, each sub-pixel may be driven in such a manner that each sub-pixel is scanned only once in one image frame. That is, one image frame includes: one initialization phase ①, one scanning phase ②, one time writing phase ③ and one light-emitting phase ④.

Figure 18:
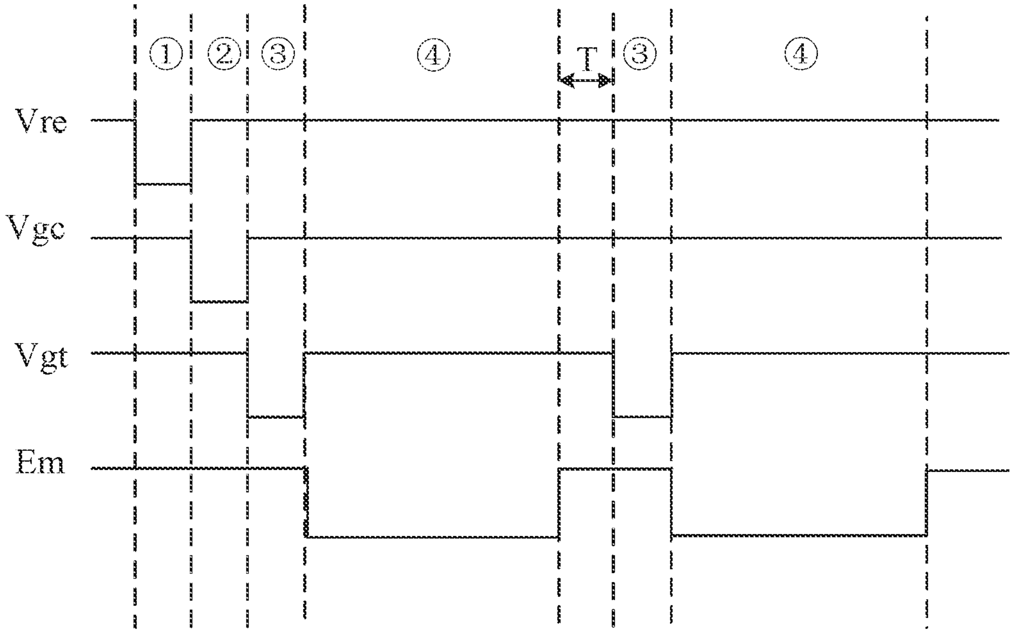
FIG. 18 is another timing signal diagram of an image display period of a display apparatus, in accordance with some embodiments of the present disclosure.

For example, referring to FIG. 18, within each image frame of the image display period, each sub-pixel may also be driven in such a manner that each sub-pixel is scanned a plurality of times in one image frame. That is, one image frame includes: one initialization phase ①, one scanning phase ②, a plurality of time writing phases ③ and a plurality of light-emitting phases ④, and the number of time writing phases ③ is equal to the number of light emitting phases ④. Each time writing phase ③ is followed by one light-emitting phase ④ after which a next writing phase ③ and a next light-emitting phase ④ is performed. Such a cycle is performed until the end of the image frame.

It will be noted that in a case where each sub-pixel is driven in such a manner that each sub-pixel is scanned a plurality of times in one image frame, for example, each sub-pixel is scanned twice in one image frame, as shown in FIG. 18, a time period T is spaced between the light-emitting phase ④ of a first scanning and the time writing phase ③ of a second scanning of a certain sub-pixel 110. This is because the sub-pixels 110 in a same column are connected to a same time data signal line Ld2, and receive time data signals under control of different time scanning signal lines Lg2 (see FIG. 13). The sub-pixels 110 in different rows are connected to different time data signal lines Ld2, that is, the time at which the time scanning signals Vgt are received does not overlap. That is, the time data signal line Ld2 corresponding to one sub-pixel column is used repeatedly in different time periods within one image frame. In the time writing phase ③ of the first scanning, after respective sub-pixel 110 in the sub-pixel column receives a corresponding time scanning signal Vgt, the time writing phase ③ of the second scanning is entered to transmit the time scanning signal Vgt. In the first scanning, a duration of a working level of the light-emitting signal Em of the sub-pixel is less than a sum of the time for sequentially receiving the effective levels of the time scanning signals Vgt by all pixel rows of the corresponding pixel column. Therefore, after a certain sub-pixel 110 undergoes the light-emitting phase ④ of the first scanning in an image frame, it is necessary to wait for other sub-pixels 110 that are in the same sub-pixel column as and arranged behind the sub-pixel 110 to finish receiving the time scanning signals Vgt of the first scanning, and to wait for other sub-pixels 110 that are in the same sub-pixel column as and arranged before the sub-pixel 110 to finish receiving the time scanning signals Vgt of the second scanning. That is, the sub-pixel 110 needs to wait for the time period T before entering the time writing phase ③ of the second scanning.

Herein, the "other sub-pixels 110 that are in the same sub-pixel column as and arranged behind the sub-pixel 110" as described above refers to other sub-pixels 110 that are in the same sub-pixel column as the sub-pixel 110 and receive the time scanning signals Vgt later than the sub-pixel 110 in one scanning; and the "other sub-pixels 110 arranged in the same sub-pixel column as and before the sub-pixel 110" as described above refers to other sub-pixels 110 that are in the same sub-pixel column as the sub-pixel 110 and receive the time scanning signals Vgt prior to the sub-pixels 110 in one scanning.

The forgoing descriptions are merely specific implementations of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A pixel driving circuit, comprising:

a driving sub-circuit configured to supply a driving signal to an element to be driven;

a detection sub-circuit electrically connected to a detection control signal terminal and a detection node, and configured to detect a voltage value of the detection node in response to a detection control signal received at the detection control signal terminal, wherein the detection node is equivalent to a point on a connection line between the driving sub-circuit and the element to be driven; and a compensation sub-circuit electrically connected to a compensation control signal terminal, a compensation data signal terminal, the detection node and a compensation output terminal; the compensation sub-circuit is configured to transmit the driving signal supplied by the driving sub-circuit from the detection node to the compensation output terminal according to a first compensation data signal received at the compensation data signal terminal and in response to a compensation control signal received at the compensation control signal terminal; wherein the compensation sub-circuit includes: an input unit, a storage unit and a compensation control unit, wherein the input unit is electrically connected to the compensation control signal terminal, the compensation data signal terminal and the storage unit, and is configured to write the first compensation data signal into the storage unit in response to the compensation control signal;

the storage unit is further electrically connected to the compensation control unit, and is configured to generate and store a second compensation data signal according to the written first compensation data signal, and to output the second compensation data signal to the compensation control unit; and the compensation control unit is further electrically connected to the detection node and the compensation output terminal, and is configured to turn on a connection circuit between the detection node and the compensation output terminal in response to the second compensation data signal;

the compensation control unit includes a seventh transistor, wherein a control electrode of the seventh transistor is electrically connected to the storage unit, a first electrode of the seventh transistor is electrically connected to the detection node, and a second electrode of the seventh transistor is electrically connected to the compensation output terminal.

2. The pixel driving circuit according to claim 1, wherein the input unit includes a second transistor, a control electrode of the second transistor being electrically connected to the compensation control signal terminal, a first electrode of the second transistor being electrically connected to the compensation data signal terminal, and a second electrode of the second transistor being electrically connected to the storage unit.

3. The pixel driving circuit according to claim 1, wherein the storage unit includes a first inverter and a second inverter; wherein a first terminal of the first inverter is electrically connected to the input unit and a fourth terminal of the second inverter, a second terminal of the first inverter is electrically connected to a first voltage terminal, a third terminal of the first inverter is electrically connected to a second voltage terminal, and a fourth terminal of the first inverter is electrically connected to the compensation control unit and a first terminal of the second inverter; and a second terminal of the second inverter is electrically connected to the first voltage terminal, and a third terminal of the second inverter is electrically connected to the second voltage terminal.

4. The pixel driving circuit according to claim 3, wherein the first inverter includes a third transistor and a fourth transistor, and the second inverter includes a fifth transistor and a sixth transistor; wherein each of the third transistor and the fifth transistor is one of P-type transistor and N-type transistor, and each of the fourth transistor and the sixth transistor is another one of the P-type transistor and the N-type transistor;

a control electrode of the third transistor is electrically connected to the input unit, a second electrode of the fifth transistor and a second electrode of the sixth transistor, a first electrode of the third transistor is electrically connected to the first voltage terminal, and a second electrode of the third transistor is electrically connected to a second electrode of the fourth transistor, a control electrode of the fifth transistor, a control electrode of the sixth transistor and the compensation control unit;

a control electrode of the fourth transistor is electrically connected to the input unit, the second electrode of the fifth transistor and the second electrode of the sixth transistor, a first electrode of the fourth transistor is electrically connected to the second voltage terminal, and the second electrode of the fourth transistor is further electrically connected to the control electrode of the fifth transistor, the control electrode of the sixth transistor and the compensation control unit;

a first electrode of the fifth transistor is electrically connected to the first voltage terminal, and the second electrode of the fifth transistor is electrically connected to the second electrode of the sixth transistor; and a first electrode of the sixth transistor is electrically connected to the second voltage terminal.

5. A pixel driving circuit, comprising:

a driving sub-circuit configured to supply a driving signal to an element to be driven;

a detection sub-circuit electrically connected to a detection control signal terminal and a detection node, and configured to detect a voltage value of the detection node in response to a detection control signal received at the detection control signal terminal, wherein the detection node is equivalent to a point on a connection line between the driving sub-circuit and the element to be driven; and a compensation sub-circuit electrically connected to a compensation control signal terminal, a compensation data signal terminal, the detection node and a compensation output terminal; the compensation sub-circuit is configured to transmit the driving signal supplied by the driving sub-circuit from the detection node to the compensation output terminal according to a first compensation data signal received at the compensation data signal terminal and in response to a compensation control signal received at the compensation control signal terminal; wherein the detection sub-circuit includes a first transistor, a control electrode of the first transistor being electrically connected to the detection control signal terminal, a first electrode of the first transistor being electrically connected to the detection node, and a second electrode of the first transistor being configured to output the voltage value of the detection node; and the compensation sub-circuit includes a second transistor, a third transistor, a fourth transistor, a fifth transistor, a sixth transistor and a seventh transistor; each of the third transistor and the fifth transistor is one of P-type transistor and N-type transistor, and each of the fourth transistor and the sixth transistor is another one of the P-type transistor and the N-type transistor, wherein a control electrode of the second transistor is electrically connected to the compensation control signal terminal, a first electrode of the second transistor is electrically connected to the compensation data signal terminal, and a second electrode of the second transistor is electrically connected to a control electrode of the third transistor and a control electrode of the fourth transistor;

the control electrode of the third transistor is further electrically connected to a second electrode of the fifth transistor and a second electrode of the sixth transistor, a first electrode of the third transistor is electrically connected to a first voltage terminal, and a second electrode of the third transistor is electrically connected to a second electrode of the fourth transistor, a control electrode of the fifth transistor, a control electrode of the sixth transistor and a control electrode of the seventh transistor;

the control electrode of the fourth transistor is further electrically connected to the second electrode of the fifth transistor and the second electrode of the sixth transistor, a first electrode of the fourth transistor is electrically connected to a second voltage terminal, and the second electrode of the fourth transistor is electrically connected to the control electrode of the fifth transistor, the control electrode of the sixth transistor and the control electrode of the seventh transistor;

a first electrode of the fifth transistor is electrically connected to the first voltage terminal, and the second electrode of the fifth transistor is electrically connected to the second electrode of the sixth transistor;

a first electrode of the sixth transistor is electrically connected to the second voltage terminal; and a first electrode of the seventh transistor is electrically connected to the detection node, and a second electrode of the seventh transistor is electrically connected to the compensation output terminal.

6. The pixel driving circuit according to claim 5, wherein the first transistor, the second transistor and the seventh transistor are all P-type transistors or are all N-type transistors.

7. The pixel driving circuit according to claim 1, wherein the driving sub-circuit includes: a driving signal control unit and a light-emitting time control unit; wherein the driving signal control unit is electrically connected to a current scanning signal terminal, a light-emitting control signal terminal, a current data signal terminal and the light-emitting time control unit, and is configured to generate the driving signal according to a current data signal received at the current data signal terminal and in response to a current scanning signal received at the current scanning signal terminal and a light-emitting control signal received at the light-emitting control signal terminal, and to transmit the driving signal to the light-emitting time control unit; and the light-emitting time control unit is electrically connected to a time scanning signal terminal, a time data signal terminal and the element to be driven, and is configured to transmit the driving signal to the element to be driven according to a time data signal received at the time data signal terminal and in response to a time scanning signal received at the time scanning signal terminal, and to control duration for transmitting the driving signal to the element to be driven.

8. The pixel driving circuit according to claim 7, wherein the driving signal control unit includes: a current data writing subunit, a compensation subunit, a first driving subunit, a light-emitting control subunit and an initialization subunit; wherein the current data writing subunit is electrically connected to the current scanning signal terminal, the current data signal terminal and the first driving subunit, and is configured to write the current data signal into the first driving subunit in response to the current scanning signal;

the compensation subunit is electrically connected to the current scanning signal terminal and the first driving subunit, and is configured to compensate the first driving subunit for a threshold voltage in response to the current scanning signal;

the first driving subunit is electrically connected to a third voltage terminal and the light-emitting control subunit, and is configured to generate and output the driving signal according to the written current data signal and a third voltage signal received at the third voltage terminal;

the light-emitting control subunit is electrically connected to the light-emitting control signal terminal, the third voltage terminal, the first driving subunit and the light-emitting time control unit, and is configured to transmit the driving signal output by the first driving subunit to the light-emitting time control unit according to the third voltage signal and in response to the light-emitting control signal;

the initialization subunit is electrically connected to a reset signal terminal, an initialization voltage terminal and the first driving subunit, and is configured to transmit an initialization voltage signal received at the initialization voltage terminal to the first driving subunit in response to a reset signal received at the reset signal terminal, so as to initialize the first driving subunit;

the light-emitting time control unit includes a time data writing subunit and a second driving subunit; wherein the time data writing subunit is electrically connected to the time scanning signal terminal, the time data signal terminal and the second driving subunit, and is configured to write the time data signal into the second driving subunit in response to the time scanning signal; and the second driving subunit is electrically connected to a common voltage terminal, the driving signal control unit and the element to be driven, and is configured to transmit the driving signal to the element to be driven according to the written time data signal and a common voltage signal received at the common voltage terminal.

9. The pixel driving circuit according to claim 8, wherein the current data writing subunit includes an eighth transistor; a control electrode of the eighth transistor is electrically connected to the current scanning signal terminal, a first electrode of the eighth transistor is electrically connected to the current data signal terminal, and a second electrode of the eighth transistor is electrically connected to the first driving subunit;

the compensation subunit includes a ninth transistor; a control electrode of the ninth transistor is electrically connected to the current scanning signal terminal, and both a first electrode and a second electrode of the ninth transistor are electrically connected to the first driving subunit;

the first driving subunit includes a driving transistor and a first capacitor; a control electrode of the driving transistor is electrically connected to a second terminal of the first capacitor, a first electrode of the driving transistor is electrically connected to the current data writing subunit and the light-emitting control subunit, and a second electrode of the driving transistor is electrically connected to the compensation subunit and the light-emitting control subunit; a first terminal of the first capacitor is electrically connected to the third voltage terminal, and the second terminal of the first capacitor is electrically connected to the compensation subunit;

the light-emitting control subunit includes a tenth transistor and an eleventh transistor; a control electrode of the tenth transistor is electrically connected to the light-emitting control signal terminal, a first electrode of the tenth transistor is electrically connected to the third voltage terminal, and a second electrode of the tenth transistor is electrically connected to the first driving subunit; a control electrode of the eleventh transistor is electrically connected to the light-emitting control signal terminal, a first electrode of the eleventh transistor is electrically connected to the first driving subunit, and a second electrode of the eleventh transistor is electrically connected to the light-emitting time control unit;

the initialization subunit includes a twelfth transistor; a control electrode of the twelfth transistor is electrically connected to the reset signal terminal, a first electrode of the twelfth transistor is electrically connected to the initialization voltage terminal, and a second electrode of the twelfth transistor is electrically connected to the first driving subunit;

the time data writing subunit includes a thirteenth transistor; a control electrode of the thirteenth transistor is electrically connected to the time scanning signal terminal, a first electrode of the thirteenth transistor is electrically connected to the time data signal terminal, and a second electrode of the thirteenth transistor is electrically connected to the time data writing subunit; and the second driving subunit includes a fourteenth transistor and a second capacitor; a control electrode of the fourteenth transistor is electrically connected to a first terminal of the second capacitor, a first electrode of the fourteenth transistor is electrically connected to the light-emitting control subunit, and a second electrode of the fourteenth transistor is electrically connected to the element to be driven; the first terminal of the second capacitor is electrically connected to the time data writing subunit, and a second terminal of the second capacitor is electrically connected to the common voltage terminal.

10. A pixel driving method applied to the pixel driving circuit according to claim 1, the pixel driving method comprising:

in a scanning phase, writing a current data signal into the driving sub-circuit of the pixel driving circuit;

in a light-emitting phase, generating, by the driving sub-circuit, the driving signal according to the written current data signal, and supplying the driving signal to the element to be driven corresponding to the pixel driving circuit; and in a detection phase, detecting, by the detection sub-circuit of the pixel driving circuit, the voltage value of the detection node of the pixel driving circuit under control of the detection control signal, and outputting, by the detection sub-circuit of the pixel driving circuit, the voltage value of the detection node;

in a compensation phase, receiving, by the compensation sub-circuit, the compensation control signal and the first compensation data signal, and transmitting, by the compensation sub-circuit, the driving signal supplied by the driving sub-circuit to the compensation output terminal corresponding to the pixel driving circuit from the detection node according to the first compensation data signal and under control of the compensation control signal;

wherein the detection phase is within the light-emitting phase, and the compensation phase is within the light-emitting phase; and in the compensation phase, writing, by the input unit, the first compensation data signal into the storage unit under the control of the compensation control signal;

generating and storing, by the storage unit, the second compensation data signal according to the written first compensation data signal;

outputting, by the storage unit, the second compensation data signal to the compensation control unit;

turning on, by the compensation control unit, the connection circuit between the detection node and the compensation output terminal with the seventh transistor being turned on under control of the second compensation data signal.

11. A display panel, comprising a plurality of sub-pixels, wherein at least one sub-pixel of the plurality of sub-pixels including the pixel driving circuit according to claim 1, and the element to be driven including at least one light-emitting diode.

12. The display panel according to claim 11, wherein a compensation output terminal corresponding to each sub-pixel of the at least one sub-pixel is electrically connected to a detection node of a pixel driving circuit of a sub-pixel that emits a same color as and is closest to the sub-pixel.

13. The display panel according to claim 12, wherein the plurality of sub-pixels are arranged in an array, and the plurality of sub-pixels arranged in the array include a plurality of rows of sub-pixels emitting a same color or a plurality of columns of sub-pixels emitting a same color; and in each row of sub-pixels emitting the same color or each column of sub-pixels emitting the same color, a compensation output terminal corresponding to one of every two adjacent sub-pixels is electrically connected to a detection node of a pixel driving circuit of another one of the two adjacent sub-pixels.

14. A display apparatus, comprising:

the display panel according to claim 11; and a processor, wherein the processor is electrically connected to the detection sub-circuit of the pixel driving circuit of at least one sub-pixel of the display panel, and is configured to transmit the detection control signal to the detection sub-circuit connected thereto, and to receive the voltage value of the detection node detected by the detection sub-circuit connected thereto, and to determine a working state of the element to be driven according to the voltage value of the detection node.

15. The display apparatus according to claim 14, wherein the processor is further electrically connected to the compensation sub-circuit of the pixel driving circuit of at least one sub-pixel of the display panel, and the processor is further configured to transmit the compensation control signal and the first compensation data signal to a respective compensation sub-circuit in response that it is determined that the working state of the element to be driven is open-circuited.

* * * * *